United States Patent
Zheng et al.

(10) Patent No.: US 10,856,289 B2
(45) Date of Patent: Dec. 1, 2020

(54) UPLINK INFORMATION SENDING METHOD AND APPARATUS AND UPLINK INFORMATION RECEIVING METHOD AND APPARATUS

(71) Applicant: Huawei Technologies Co., Ltd., Guangdong (CN)

(72) Inventors: Juan Zheng, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/148,744

(22) Filed: Oct. 1, 2018

(65) Prior Publication Data
US 2019/0037565 A1  Jan. 31, 2019

Related U.S. Application Data

(63) Continuation of application No. PCT/CN2016/078289, filed on Apr. 1, 2016.

(51) Int. Cl.
*H04W 72/00* (2009.01)
*H04W 72/04* (2009.01)
(Continued)

(52) U.S. Cl.
CPC ....... *H04W 72/0446* (2013.01); *H04W 72/04* (2013.01); *H04W 72/1284* (2013.01); *H04W 74/00* (2013.01)

(58) Field of Classification Search
CPC ......... H04W 72/0446; H04W 72/1284; H04W 74/00; H04W 72/04; H04W 72/14; H04W 72/1273; H04W 72/1263
See application file for complete search history.

(56) References Cited

U.S. PATENT DOCUMENTS

2010/0172308 A1  7/2010  Nam et al.
2015/0271842 A1*  9/2015  He .................. H04W 52/44
                                                      370/329
(Continued)

FOREIGN PATENT DOCUMENTS

CN  104812032 A  7/2015
CN  105101223 A  11/2015
(Continued)

OTHER PUBLICATIONS

Intel Corporation, "Introduction of cross-burst scheduling", 3GPP TSG RAN WG1 Meeting #84, R1-160427, Feb. 2016, 5 pages.
(Continued)

*Primary Examiner* — Lakeram Jangbahadur
(74) *Attorney, Agent, or Firm* — Fish & Richardson P.C.

(57) ABSTRACT

In an uplink information sending method, a terminal device receives scheduling information sent by an access network device in a first time unit. The terminal device determines a second time unit and a first time offset. The second time unit is after the first time unit, and the second time unit carries downlink information sent by the access network device. The terminal device further determines a third time unit. The third time unit is a time unit that is offset from the second time unit by the first time offset. Further, the terminal device sends first uplink information scheduled by using the scheduling information in the third time unit. In this way, information transmission flexibility and reliability can be improved.

12 Claims, 17 Drawing Sheets

(51) Int. Cl.
*H04W 74/00* (2009.01)
*H04W 72/12* (2009.01)

(56) References Cited

U.S. PATENT DOCUMENTS

| | | | |
|---|---|---|---|
| 2016/0242169 A1 | 8/2016 | Park et al. | |
| 2016/0345344 A1* | 11/2016 | Larsson | H04W 72/1289 |
| 2017/0085326 A1 | 3/2017 | Li et al. | |
| 2017/0111889 A1 | 4/2017 | Li et al. | |
| 2017/0150367 A1* | 5/2017 | Han | H04W 16/14 |
| 2017/0290040 A1* | 10/2017 | Dinan | H04W 76/27 |
| 2017/0353272 A1 | 12/2017 | Takeda et al. | |

FOREIGN PATENT DOCUMENTS

| | | | | |
|---|---|---|---|---|
| CN | 105101283 A | 11/2015 | | |
| CN | 105338641 A | 2/2016 | | |
| KR | 20150035672 A | 4/2015 | | |
| WO | 2014107904 A1 | 7/2014 | | |
| WO | WO-2014107904 A1 * | 7/2014 | | H04L 5/0053 |
| WO | 2015188557 A1 | 12/2015 | | |
| WO | 2016072257 A1 | 5/2016 | | |

OTHER PUBLICATIONS

Qualcomm Incorporated, "Control details for UL in LAA", 3GPP TSG RAN WG1 #84, R1-160885, Feb. 2016, 5 pages.
"3rd Generation Partnership Project; Technical Specification Group Radio Access Network; Evolved Universal Terrestrial Radio Access (E-UTRA); Physical layer procedures (Release 13)", 3GPP TS 36.213 V13.1.0 (Mar. 2016), Mar. 2016, 361 pages.
Office Action issued in Japanese Application No. 2018-551858 dated Aug. 9, 2019, 9 pages (with English translation).
ZTE, "UL framework for LAA," 3GPP TSG RAN WG1 Meeting #82,R1-154048; Beijing, China, Aug. 24-28, 2015, 6 pages.
Office Action issued in Chinese Application No. 201680083683.9 dated Feb. 3, 2020, 22 pages (with English translation).
MediaTek Inc., "Uplink channel access in LAA," 3GPP TSG RAN WG1 #84, R1-160976; St Julian's, Malta, Feb. 15-19, 2016, 11 pages.
Office Action issued in Korean Application No. 2018-7031317 dated Feb. 19, 2020, 8 pages (with English translation).
Office Action issued in Korean Application No. 2018-7031317 dated Sep. 25, 2020, 3 pages (with English translation).
Huawei, HiSilicon, "Downlink signaling for LAA transmission burst related information," 3GPP TSG RAN WG1 Meeting It83, R1-156904, Anaheim, USA, Nov. 15-22, 2015, 10 pages.
ZTE, "UL framework for LAA," 3GPP TSG RAN WG1 Meeting #83, R1-156994, Anaheim, USA, Nov. 15-22, 2015, 6 pages.

* cited by examiner

UPLINK INFORMATION SENDING METHOD AND APPARATUS AND UPLINK INFORMATION RECEIVING METHOD AND APPARATUS

CROSS-REFERENCE TO RELATED APPLICATIONS

This application is a continuation of International Application No. PCT/CN2016/078289 filed on Apr. 1, 2016, the disclosure of which is hereby incorporated by reference in its entirety.

TECHNICAL FIELD

The present application relates to the communication field, and more specifically, to an uplink information sending method and apparatus and an uplink information receiving method and apparatus.

BACKGROUND

In a known communication technology, an access network device (for example, a base station) sends scheduling information (or control information) to a terminal device by using a time domain resource (which, for ease of understanding and distinguishing, is denoted as a time domain resource # X). In addition, a communication system specifies a time sequence relationship (or a time-domain positional relationship) between a time domain resource (which, for ease of understanding and distinguishing, is denoted as a time domain resource # Y) used for transmitting uplink information and the time domain resource # X. Therefore, the terminal device may determine the time domain resource # Y based on the time domain resource # X and the time sequence relationship, and transmit the uplink information on the time domain resource # Y.

For example, in the prior art, no matter it is a frequency division duplex (FDD) system or a time division duplex (TDD) system, a terminal device determines, by using a subframe carrying scheduling information (for example, a subframe carrying an uplink scheduling grant (UL grant, Uplink grant), and/or a subframe of a physical hybrid automatic repeat request indicator channel (PHICH)) and a time sequence relationship between the subframe and a subframe that is used to carry scheduled uplink information, the subframe that is used to carry the scheduled uplink information. For example, as shown in FIG. 1, taking the frequency division duplex system for an example, considering a normal hybrid automatic repeat request (HARD), if scheduling information (or control signaling) for uplink information transmission is detected by a terminal device in a subframe n in a serving cell, the terminal device may send uplink information in a subframe n+4. The scheduling information may be sent by downlink control information (DCI) format 0 or format 4 (format 4). The scheduling information may be carried on a physical downlink control channel (PDCCH) and/or an enhanced physical downlink control channel (EPDCCH). For another example, still taking the frequency division duplex system for an example, considering a normal HARQ, if PHICH transmission corresponding to a terminal device is detected by the user equipment in a subframe n in a serving cell, the user equipment may send uplink information in a subframe n+4.

However, with the use of, for example, an unlicensed frequency domain resource (or an unlicensed band), a subframe used through contention arises. For example, as shown in FIG. 2, there are at least one downlink subframe (or downlink burst) between an uplink subframe (or an uplink burst) scheduled by using scheduling information sent by an access network device and a subframe in which the scheduling information is located. In addition, the access network device may need to determine, in a manner specified in a contention mechanism such as listen before talk (LBT), whether the downlink subframe can be used. That is, a downlink subframe of which a location is uncertain (for example, due to the LBT mechanism) exists between the uplink subframe scheduled by using the scheduling information and the subframe in which the scheduling information is located. In FIG. 2, "D" represents downlink information transmission, and "U" represents uplink information transmission. In this case, because information transmission on an unlicensed band is opportunistic, as shown in FIG. 3, if the solution provided in the prior art is used, a determined uplink subframe location may be unable to be used for uplink transmission. That is, the determined uplink subframe location may be used for downlink information transmission. In this case, interference is generated between the uplink information transmission and the downlink information transmission. Alternatively, as shown in FIG. 4, if an uplink subframe indicated by control information is still used for uplink information transmission, which is equivalent to that a time location indicated by the control information needs to be reserved for uplink, downlink information transmission on the unlicensed band is affected.

Alternatively, to better match a data service characteristic, a quantity of subframes occupied by the downlink information transmission may vary at any time. If downlink subframes whose quantity is uncertain exist between the uplink subframe scheduled by using the scheduling information and the subframe in which the scheduling information is located, interference may also be generated between the uplink information transmission and the downlink information transmission, or the downlink information transmission is affected. As shown in FIG. 5, when the access network device sends the scheduling information, an expected downlink burst includes, for example, four downlink subframes. However, as shown in FIG. 6, after the scheduling information is sent, it may be expected, based on a downlink service load status, that more than four (for example, six) downlink subframes are transmitted in the downlink burst including the scheduling information. In this case, the access network device expects that the fourth subframe after a subframe including the scheduling information is a downlink subframe. However, alternatively, if the prior art is used, the fourth subframe after the subframe including the scheduling information is inevitably an uplink subframe (using the FDD system as an example). Apparently, according to the prior art, interference is generated between the uplink information transmission and the downlink information transmission, or the downlink information transmission is affected.

That is, in the communication technology, a time interval between the time domain resource # X and the time domain resource # Y is a fixed value. That is, once the terminal device receives the scheduling information from the access network device, an opportunity of transmitting uplink information is correspondingly determined. This severely limits information transmission flexibility and affects information transmission reliability.

SUMMARY

The present application provides an uplink information transmission method and apparatus, so as to improve information transmission flexibility and reliability.

According to a first aspect, an uplink information sending method is provided. The method includes: receiving, by a terminal device in a first time unit, scheduling information sent by an access network device; determining, by the terminal device, a second time unit and a first time offset, where the second time unit is after the first time unit, and the second time unit carries downlink information sent by the access network device; determining, by the terminal device, a third time unit, where the third time unit is a time unit that is offset from the second time unit by the first time offset; and sending, by the terminal device in the third time unit, first uplink information scheduled by using the scheduling information.

According to the uplink information transmission method in this embodiment of the present application, the terminal device and the access network device determine, based on the second time unit used to carry the downlink information, the third time unit used to carry the uplink information, and enable the second time unit to differ from the first time unit used to carry the scheduling information, thereby avoiding a limit of the first time unit on a process of determining the third time unit, and improving information transmission flexibility and reliability.

With reference to the first aspect, in a first implementation of the first aspect, the determining, by the terminal device, a second time unit includes: determining, by the terminal device, the second time unit based on a first preset rule, where the first preset rule is used to indicate a location of the second time unit.

The access network device and the terminal device use a same first preset rule to determine the second time unit, so as to reduce signaling interaction between the access network device and the terminal device, thereby reducing resource overheads.

With reference to the first aspect and the foregoing implementation of the first aspect, in a second implementation of the first aspect, the determining, by the terminal device, a second time unit includes: receiving, by the terminal device, second indication information sent by the access network device, where the second indication information is used to indicate the second time unit; and determining, by the terminal device, the second time unit based on the second indication information.

The terminal device determines the second time unit based on an indication of the access network device, so as to improve configuration flexibility of the second time unit.

With reference to the first aspect and the foregoing implementations of the first aspect, in a third implementation of the first aspect, the method further includes: receiving, by the terminal device, third indication information sent by the access network device, where the third indication information is used to indicate the first time offset.

The terminal device determines the first time offset based on an indication of the access network device, so as to improve configuration flexibility of first time offset.

With reference to the first aspect and the foregoing implementations of the first aspect, in a fourth implementation of the first aspect, the method further includes: determining, by the terminal device, a fourth time unit, where a preset second time offset exists between the fourth time unit and the first time unit; and sending, by the terminal device in the fourth time unit, second uplink information scheduled by using the scheduling information.

With reference to the first aspect and the foregoing implementations of the first aspect, in a fifth implementation of the first aspect, the method further includes: receiving, by the terminal device, configuration information sent by the access network device, where the configuration information is used to indicate that the third time unit is determined based on the second time unit; and the determining, by the terminal device, a third time unit includes: determining, by the terminal device, the third time unit based on the configuration information.

According to a second aspect, an uplink information receiving method, is provided. The method includes: sending, by an access network device, scheduling information to a terminal device in a first time unit; determining, by the access network device, a second time unit and a first time offset, where the second time unit is after the first time unit, and the second time unit carries downlink information sent by the access network device; determining, by the access network device, a third time unit, where the third time unit is a time unit that is offset from the second time unit by the first time offset; and receiving, by the access network device in the third time unit, first uplink information scheduled by using the scheduling information.

With reference to the second aspect, in a first implementation of the second aspect, the determining, by the access network device, a second time unit includes: determining, by the access network device, the second time unit based on a first preset rule.

With reference to the second aspect and the foregoing implementation of the second aspect, in a second implementation of the second aspect, the method further includes: sending, by the access network device, second indication information to the terminal device, where the second indication information is used to indicate the second time unit.

With reference to the second aspect and the foregoing implementations of the second aspect, in a third implementation of the second aspect, the method further includes: determining, by the terminal device, the first time offset based on a second preset rule.

With reference to the second aspect and the foregoing implementations of the second aspect, in a fourth implementation of the second aspect, the method further includes: sending, by the access network device, third indication information to the terminal device, where the third indication information is used to indicate the first time offset.

With reference to the second aspect and the foregoing implementations of the second aspect, in a fifth implementation of the second aspect, the method further includes: determining, by the access network device, a fourth time unit, where a preset second time offset exists between the fourth time unit and the first time unit; and sending, by the access network device in the fourth time unit, second uplink information scheduled by using the scheduling information.

With reference to the second aspect and the foregoing implementations of the second aspect, in a sixth implementation of the second aspect, the method further includes: sending, by the access network device, configuration information to the terminal device, where configuration information is used to indicate that the third time unit is determined based on the second time unit.

According to a third aspect, an uplink information transmission apparatus is provided. The apparatus includes units configured to perform the steps in the first aspect and the implementations of the first aspect.

According to a fourth aspect, an uplink information transmission apparatus is provided. The apparatus includes units configured to perform the steps in the second aspect and the implementations of the second aspect.

According to a fifth aspect, an uplink information transmission device is provided. The device includes a memory and a processor. The memory is configured to store a computer program. The processor is configured to invoke the computer program from the memory and run the computer program, so that the uplink information transmission device performs the uplink information transmission method according to any one of the first aspect and the implementations of the first aspect.

According to a sixth aspect, an uplink information transmission device is provided. The device includes a memory and a processor. The memory is configured to store a computer program. The processor is configured to invoke the computer program from the memory and run the computer program, so that the uplink information transmission device performs the uplink information transmission method according to any one of the second aspect and the implementations of the second aspect.

According to a seventh aspect, a computer program product is provided. The computer program product includes computer program code. When the computer program code is run by a receiving unit, a processing unit, and a sending unit, or a receiver, a processor, and a transmitter of an access network device, a terminal device performs the uplink information transmission method according to any one of the first aspect and the implementations of the first aspect.

According to an eighth aspect, a computer program product is provided. The computer program product includes computer program code. When the computer program code is run by a receiving unit, a processing unit, and a sending unit, or a receiver, a processor, and a transmitter of an access network device, the access network device performs the uplink information transmission method according to any one of the second aspect and the implementations of the second aspect.

According to a ninth aspect, a computer-readable storage medium is provided. The computer-readable storage medium stores a program. The program enables user equipment to perform the uplink information transmission method according to any one of the first aspect and the implementations of the first aspect.

According to a tenth aspect, a computer-readable storage medium is provided. The computer-readable storage medium stores a program. The program enables an access network device to perform the uplink information transmission method according to any one of the second aspect and the implementations of the second aspect.

With reference to the foregoing aspects and the implementations of the aspects, in another implementation, the third time unit belongs to a first uplink burst, the second time unit belongs to a second downlink burst, the first uplink burst is after the second downlink burst, and the first uplink burst is adjacent to the second downlink burst.

With reference to the foregoing aspects and the implementations of the aspects, in another implementation, the first time offset is preconfigured. Therefore, signaling interaction for the access network device and the terminal device to determine the first time offset through negotiation can be reduced, thereby reducing resource overheads.

With reference to the foregoing aspects and the implementations of the aspects, in another implementation, the third indication information is the scheduling information, or the third indication information is common control information. Therefore, information specified in an existing communication protocol can be used as the third indication information, thereby reducing signaling overheads and resource overheads.

BRIEF DESCRIPTION OF THE DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DETAILED DESCRIPTION

Figure 1:
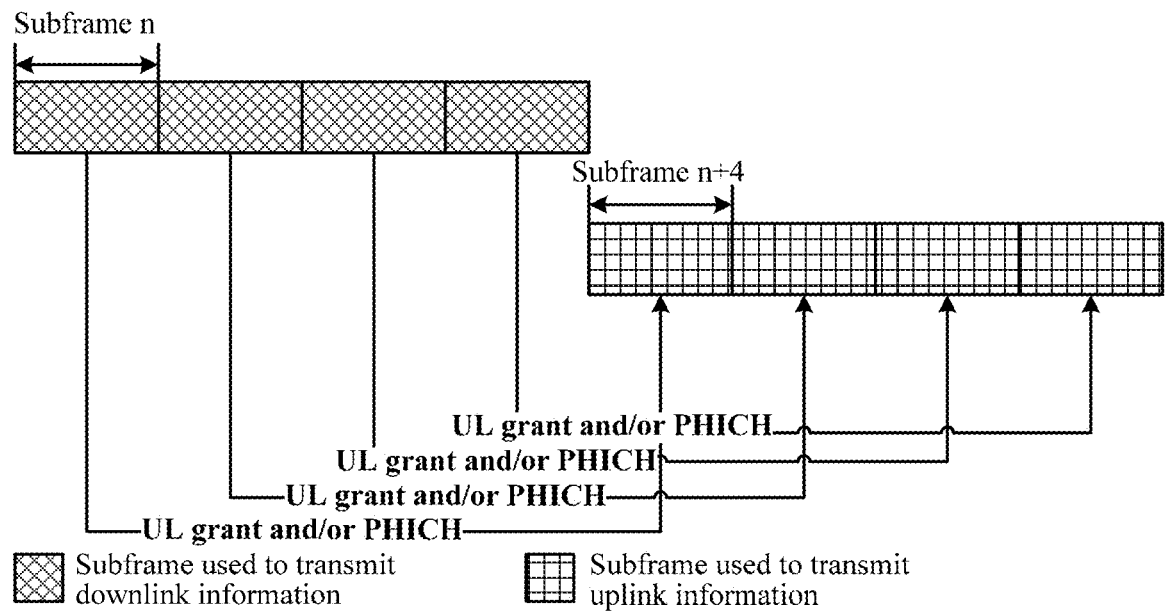
FIG. 1 is a schematic diagram of a positional relationship between a subframe used for downlink information transmission and a subframe used for uplink information transmission in the prior art.
Figure 2:
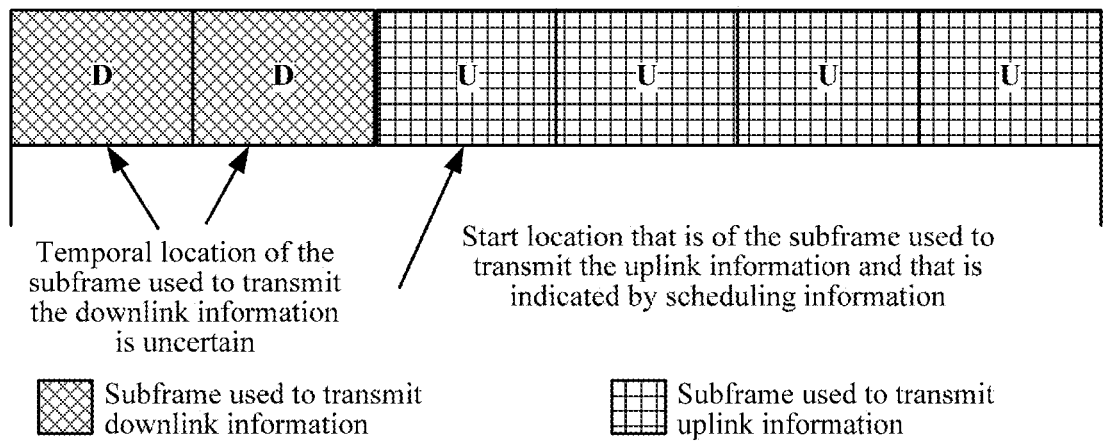
FIG. 2 is a schematic diagram of a possible positional relationship between a subframe used for downlink information transmission and a subframe used for uplink information transmission when an unlicensed band resource is used in the prior art.
Figure 3:
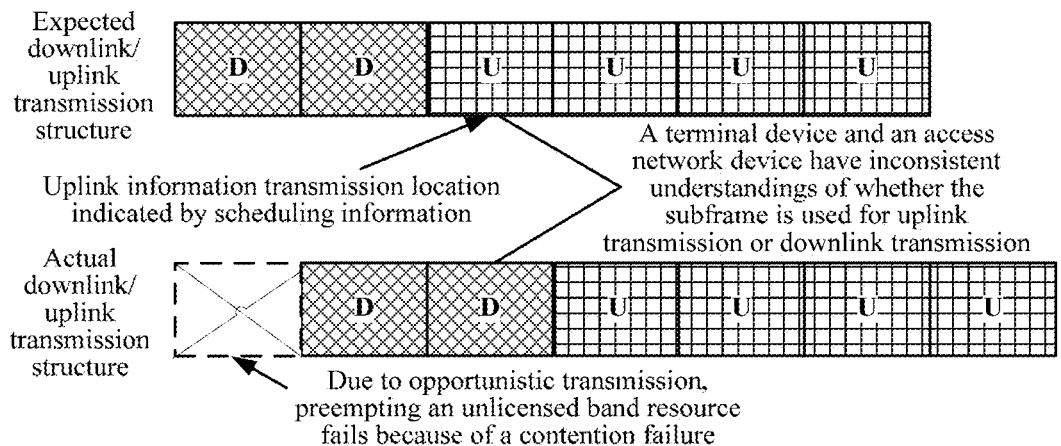
FIG. 3 is a schematic diagram of an example of a possible processing manner in a case of a contention failure in the prior art.
Figure 4:
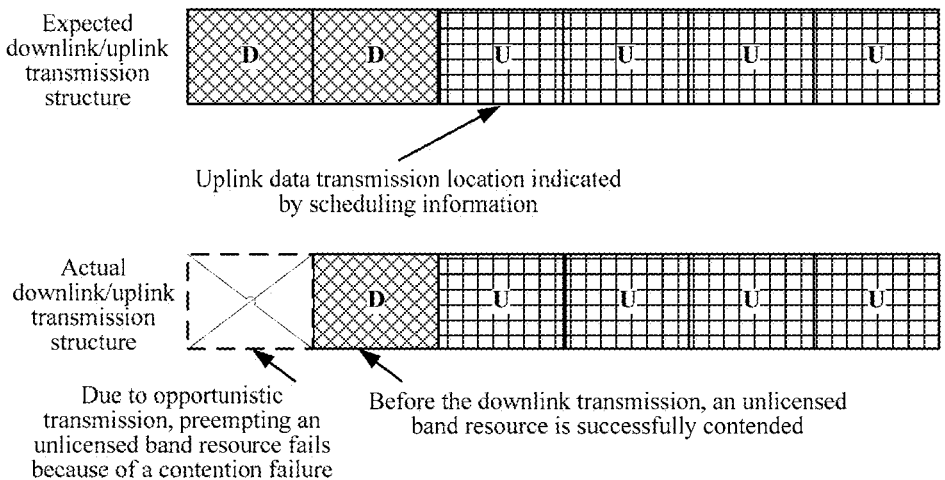
FIG. 4 is a schematic diagram of another example of a possible processing manner in a case of a contention failure in the prior art.
Figure 5:
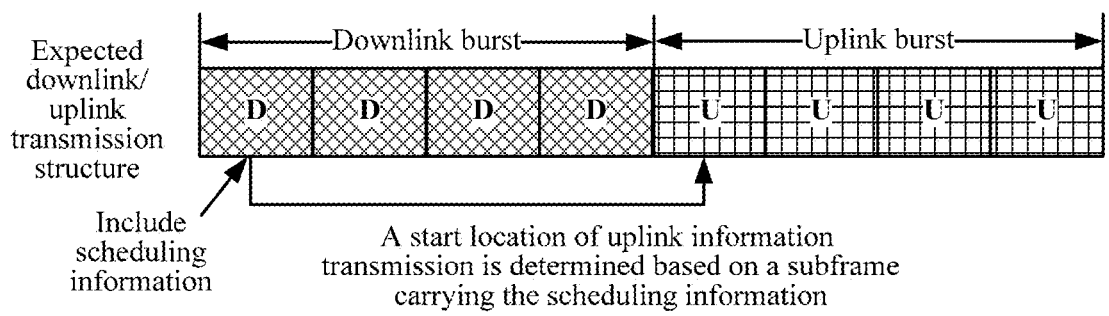
FIG. 5 is a schematic diagram of a possible positional relationship that is between a subframe used for downlink information transmission and a subframe used for uplink information transmission and that is expected by an access network device.
Figure 6:
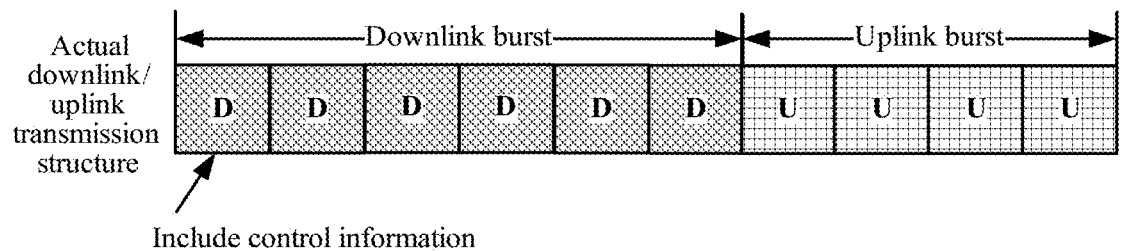
FIG. 6 is a schematic diagram of a possible positional relationship between a subframe used for downlink information transmission and a subframe used for uplink information transmission that are actually used by an access network device.

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

Aspects or features of the present application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a CD (compact disk) and a DVD (digital versatile disk)), a smart card, and a flash memory component (for example, an EPROM (erasable programmable read-only memory), a card, a stick, or a key drive). In addition, various storage media described in this specification may indicate one or more devices and/or other machine-readable media that is used to store information. The term "machine-readable media" may include but is not limited to a radio channel and various other media that can store, contain, and/or carry an instruction and/or data.

The solutions in the embodiments of the present application may be applied to existing cellular communication systems, for example, a Global System for Mobile communications (GSM), a Wideband Code Division Multiple Access (WCDMA) system, and a Long Term Evolution (Long Term Evolution) system. The existing cellular communication systems mainly support voice and data communication. Generally, connections supported by a conventional base station are limited in quantity, and therefore are easily implemented.

A next-generation mobile communication system not only supports conventional communication but also supports M2M (Machine to Machine) communication that is also referred to as MTC (Machine Type Communication) communication. It is predicted that, by 2020, there will be 50 billion to 100 billion MTC devices connected to a network, and this is much greater than a current quantity of connections. Because service types of M2M services differ greatly, requirements on a network are much different. Generally, there are the following several requirements:

a requirement for reliable transmission insensitive to a delay;

a requirement for a low delay and high-reliability transmission.

A service that requires reliable transmission insensitive to a delay is relatively easy to be processed. However, a service that requires a low delay and high-reliability transmission, such as a V2V (Vehicle to Vehicle) service or a V2X (Vehicle to Everything) service, has requirements for both a short transmission delay and reliability. Unreliable transmission causes retransmission, resulting in an extremely great transmission delay. This cannot meet the requirement.

The solutions in the embodiments of the present application can effectively resolve a transmission reliability problem.

Optionally, an access network device is a base station, and a terminal device is user equipment.

Embodiments are described with reference to the terminal device in the present application. The terminal device may also be referred to as user equipment (UE), a mobile, an access terminal, a subscriber unit, a subscriber station, a mobile station, a remote station, a remote terminal, a mobile device, a user terminal, a terminal, a wireless communication device, a user agent, or a user apparatus. The terminal device may be an ST (station) in a WLAN (wireless local area network), a cellular phone, a cordless phone, a SIP (Session Initiation Protocol) phone, a WLL (wireless local loop) station, a PDA (personal digital assistant), a handheld device having a wireless communication function, a computing device, another processing device connected to a wireless modem, an in-vehicle device, a wearable device, a mobile in a future 5G network, a terminal device in a future evolved PLMN network, or the like.

In addition, in the embodiments of the present application, the terminal device may further include a relay, another device that can perform data communication with the access network device (for example, the base station), or the like.

Embodiments are described with reference to the access network device in the present application. The access network device may be a device configured to communicate with a mobile, an AP (access point) in a WLAN (wireless local area network), a BTS (base transceiver station) in GSM or CDMA (Code Division Multiple Access), a NB (NodeB) in WCDMA, an eNB or eNodeB (evolved NodeB) in LTE (Long Term Evolution), a relay station or an access point, an in-vehicle device, a wearable device, an access network device in a future 5G network, an access network device in a future evolved PLMN network, or the like.

Figure 7:
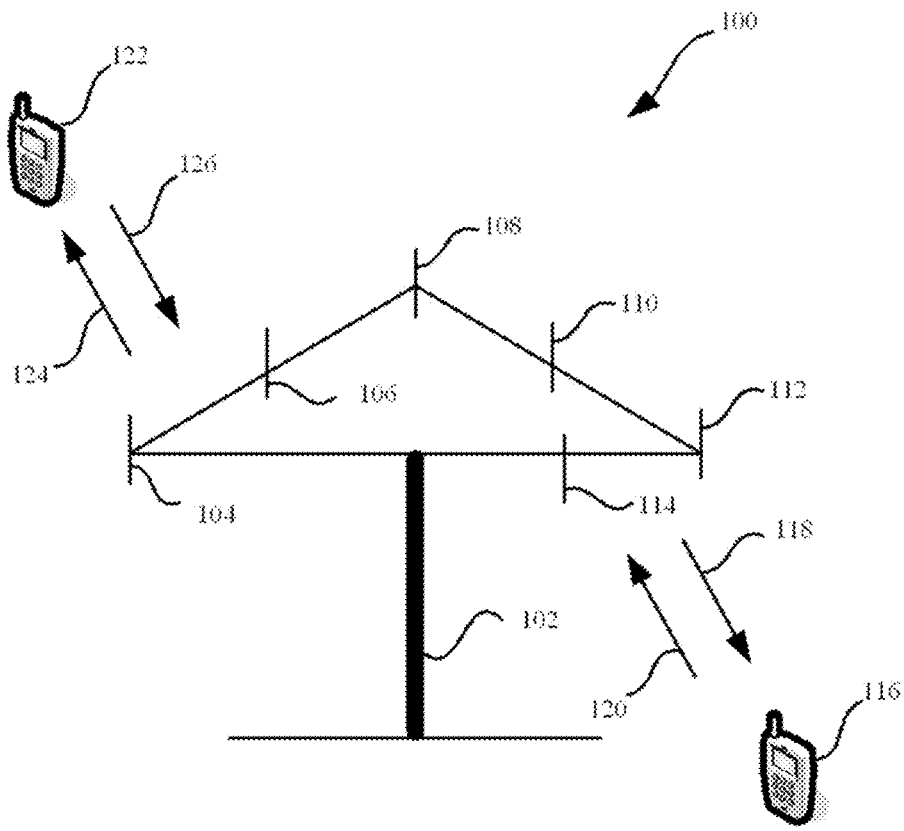
FIG. 7 is a schematic diagram of an example of a communication system to which an uplink information transmission method and apparatus in the embodiments of the present application are applicable.

FIG. 7 is a schematic diagram of a communication system 100 to which an uplink information transmission method and apparatus in the embodiments of the present application are applicable. As shown in FIG. 7, the communication system 100 includes an access network device 102. The access network device 102 may include a plurality of antennas, for example, antennas 104, 106, 108, 110, 112, and 114. In addition, the access network device 102 may additionally include a transmitter chain and a receiver chain, and a person of ordinary skill in the art may understand that both the transmitter chain and the receiver chain may include a plurality of components (for example, a processor, a modulator, a multiplexer, a demodulator, a demultiplexer, or an antenna) related to signal sending and receiving.

The access network device 102 may communicate with a plurality of terminal devices (for example, a terminal device 116 and a terminal device 122). However, it may be understood that the access network device 102 may communicate with any quantity of terminal devices similar to the terminal device 116 or 122. The terminal devices 116 and 122 each may be, for example, a cellular phone, a smartphone, a portable computer, a handheld communication device, a handheld computing device, a satellite radio apparatus, a global positioning system, a PDA, and/or any other suitable device configured to perform communication in the wireless communication system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 may use a frequency band different from a frequency band used by the reverse link 120, and the forward link 124 may use a frequency band different from a frequency band used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group including a plurality of antennas) and/or an area designed for communication are/is referred to as a sector of the access network device 102. For example, an antenna group may be designed to communicate with a terminal device in a sector within a coverage area of the access network device 102. In a process in which the access network device 102 communicates with the terminal devices 116 and 122 respectively by using the forward links 118 and 124, a transmit antenna of the access network device 102 may improve signal-to-noise ratios of the forward links 118 and 124 through beamforming. In addition, compared with a manner in which an access network device sends signals to all terminal devices of the access network device by using a single antenna, when the access network device 102 sends, through beamforming, signals to the terminal devices 116 and 122 that are randomly dispersed in a related coverage area, a mobile device in a neighbor cell suffers less interference.

In a given time, the access network device 102, the terminal device 116, or the terminal device 122 may be a wireless communication sending apparatus and/or a wireless communication receiving apparatus. When sending data, the wireless communication sending apparatus may encode the data for transmission. Specifically, the wireless communication sending apparatus may obtain (for example, generate, receive from another communication apparatus, or store in a memory) a particular quantity of data bits that need to be sent to the wireless communication receiving apparatus through a channel. The data bits may be included in a transport block (or a plurality of transport blocks) of data, and the transport block may be segmented to produce a plurality of code blocks.

In addition, the communication system 100 may be a public land mobile network (English full name: Public Land Mobile Network, PLMN for short) network, a D2D network, an M2M network, a V2V network, a V2X network, or another network. FIG. 1 is merely a simplified schematic diagram of an example. The network may further include another access network device not shown in FIG. 1.

A frequency domain resource used in the communication system 100 is described below.

Optionally, in the embodiments of the present application, the terminal device and the access network device can perform wireless communication (for example, uplink information transmission or downlink information transmission) by using an unlicensed spectrum resource (or an unlicensed band). That is, the communication system 100 in the embodiments of the present application is a communication system that can use an unlicensed band. By way of example but not limitation, the communication system 100 may use a Licensed-Assisted Access Using LTE (LAA-LTE) technology, a technology such as standalone LTE over unlicensed spectrum that supports the communication system to perform independent deployment on an unlicensed band, or an LTE-U (LTE in Unlicensed Spectrums) technology. For example, the communication system 100 may deploy an LTE system on the unlicensed band independently, and complete communication on the unlicensed band by using an LTE air interface protocol. The system does not include a licensed band. The LTE system deployed on the unlicensed band may use technologies such as concentrated scheduling, interference coordination, and hybrid automatic repeat request (HARD). Compared with a WiFi access technology or the like, these technologies have better robustness, can obtain higher spectrum efficiency, and provide larger coverage and better user experience.

In the embodiments of the present application, the communication system 100 may use, for example, a licensed-assisted access (LAA) technology, a dual connectivity (DC) technology, an unlicensed-assisted access (Standalone) technology, or the like. The licensed-assisted access LAA includes: Based on communication performed in combination with a carrier (a licensed carrier) on a licensed band of an operator, a carrier aggregation (CA) configuration and structure in an existing LTE system is used to configure carriers (unlicensed carriers) on a plurality of unlicensed bands, and perform communication by using the unlicensed carriers with assistance of the licensed carrier. That is, an LTE device may use, through CA, the licensed carrier as a primary component carrier (PCC) or a primary cell (PCell), and use the unlicensed carriers as a secondary component carrier (SCC) or a secondary cell (SCell). The dual connectivity DC technology includes a technology of jointly using a licensed carrier and an unlicensed carrier through non-CA (or, non-ideal backhaul), or a technology of jointly using a plurality of unlicensed carriers through non-CA. Alternatively, the LTE device may be directly deployed on an unlicensed carrier through independent deployment.

The unlicensed spectrum resource does not need to be allocated by the system, resources in the unlicensed spectrum can be shared by various communication devices. Resource sharing on the unlicensed band refers to imposing a limitation on only quotas such as a transmit power and out-of-band leakage for use of a particular frequency band, to ensure that a plurality of devices sharing the frequency band satisfy a basic coexistence requirement. The operator can implement network traffic offloading by using an unlicensed band resource. However, regulatory requirements of different regions and different spectrums for the unlicensed band resource need to be complied with. These requirements are generally formulated to protect a common system such as a radar and ensure that a plurality of systems do not impose harmful impact to each other as far as possible and fairly coexist, and include a transmit power limitation, an out-of-band leakage index, and indoor and outdoor use limitations, and some regions further have some additional coexistence policies and the like. For example, the communication devices can use spectrum resources through contention or interception, for example, a manner specified in listen before talk (LBT).

By way of example but not limitation, in the embodiments of the present application, the unlicensed spectrum resource may include an approximately 900 MHz frequency band near 5 GHz and an approximately 90 MHz frequency band near a 2.4 GHz frequency band.

In addition, in the embodiments of the present application, the terminal device and the access network device may alternatively perform wireless communication by using a licensed spectrum resource. That is, the communication system 100 in the embodiments of the present application is a communication system that can use a licensed band.

The licensed spectrum resource is usually a spectrum resource that can be used only after being approved by a national or local wireless communication committee. Different systems such as an LTE system and a WiFi system, or systems included by different operators cannot share a licensed spectrum resource.

In addition, in some embodiments of the present application, the access network device can provide one or more unlicensed cells (or referred to as unlicensed carriers) and one or more licensed cells (or referred to as licensed carriers).

Specifically, in the embodiments of the present application, the access network device can provide a plurality of unlicensed cells based on a capability of working in the plurality of unlicensed cells simultaneously. For example, using an eNB as an example, the eNB can work on five carriers simultaneously. In this case, the eNB can provide a maximum of five cells.

In this case, the terminal device and the access network device can use the plurality of unlicensed cells and a plurality of licensed cells based on, for example, the carrier aggregation (CA) technology or the DC technology.

By way of example but not limitation, the licensed carrier may be used as a primary component carrier or a primary cell, and the unlicensed carrier may be used as a secondary component carrier or a secondary cell.

In the embodiments of the present application, the primary cell and the secondary cell may be deployed at a co-site. That is, in the embodiments of the present application, the access network device may include an access network device that provides a licensed cell (a frequency band corresponding to the cell is a licensed band) and an unlicensed cell (a frequency band corresponding to the cell is an unlicensed band).

Alternatively, in the embodiments of the present application, the primary cell and the secondary cell may not be deployed at a co-site. There is an ideal backhaul path or a non-ideal backhaul path between various cells. For example, in the embodiments of the present application, the access network device may include an access network device that provides a licensed cell and an access network device that provides an unlicensed cell.

In some embodiments of the present application, the access network device may provide one or more unlicensed cells only and provide no licensed cell, for example, an access network device included in a standalone LTE over unlicensed spectrum system.

In this case, the terminal device and the access network device may use the plurality of unlicensed cells based on, for example, the CA technology or the DC technology. For example, when the DC technology is used, the access network device may be a primary base station or a secondary base station in the DC technology.

By way of example but not limitation, one unlicensed carrier may be used as a primary component carrier PCC or a PCell, and another unlicensed carrier may be used as a secondary component carrier or a secondary cell.

In the embodiments of the present application, the primary cell and the secondary cell may be deployed at a co-site. That is, in the embodiments of the present application, the access network device may include one access network device that provides a plurality of unlicensed cells.

Alternatively, in the embodiments of the present application, the primary cell and the secondary cell may not be deployed at a co-site. There is an ideal backhaul path between various cells. That is, in the embodiments of the present application, the access network device may include a plurality of access network devices that provide unlicensed cells.

In the present application, the mentioned cell may be a cell corresponding to a base station, the cell may belong to a macro base station or a base station corresponding to a small cell. The small cell herein may include a metro cell, a micro cell, a pico cell, a femto cell, and the like. Such small cells feature small coverage and low transmit power, and are applicable to providing a high-rate data transmission service.

For another example, in the LTE system or the like, a plurality of cells may work at a same frequency on a carrier. In this case, it can be considered that the carrier and the cell are the same concepts. For example, in a CA scenario, when a primary carrier and a secondary carrier are configured for UE, both carrier indexes of the carriers and cell identifiers (Cell ID) of cells on the carriers are carried. In this case, it can be considered that the carrier and the cell are the same concepts. For example, accessing a carrier by the terminal device is equivalent to accessing a cell by the terminal device. That is, in descriptions in the embodiments of the present application, the "cell" may be replaced with the "carrier".

A time domain resource used in the communication system 100 is described below.

In the embodiments of the present application, a time domain resource used by the access network device and the terminal device to transmit information may be divided into a plurality of time units.

In the embodiments of the present application, the plurality of time units may be contiguous, or there is a preset time interval between some adjacent time units. This is not particularly limited in the present application.

In the embodiments of the present application, the time unit may be used for uplink information (or uplink data) transmission and/or downlink information (or downlink data) transmission. In the embodiments of the present application, a length of one time unit may be arbitrarily set. This is not particularly limited in the present application. For example, in the embodiments of the present application, one time unit may be any one of the following physical quantities: one subframe, one timeslot, one or more orthogonal frequency division multiplexing (OFDM) symbols.

In the embodiments of the present application, for example, for an LTE system that does not support a short transmission time interval (S-TTI, Short Transmission Time Interval), one time unit may be represented by one subframe. The S-TTI is a transmission time interval (TTI) having a length of less than one millisecond (ms).

For another example, for an LTE system that supports an S-TTI, one time unit may be represented by one timeslot (Slot) or one or more (for example, a positive integer less than 7 or 6) orthogonal frequency division multiplexing (OFDM) symbols.

Figure 8:
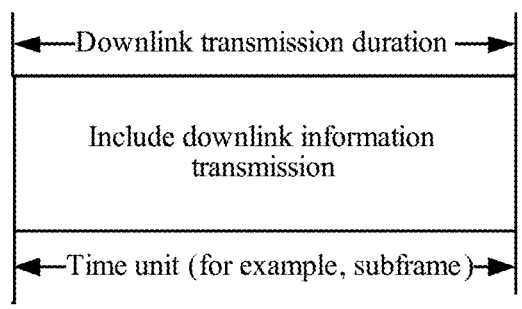
FIG. 8 is a schematic diagram of an example of a relationship between transmission duration and duration of a time unit according to an embodiment of the present application.
Figure 9:
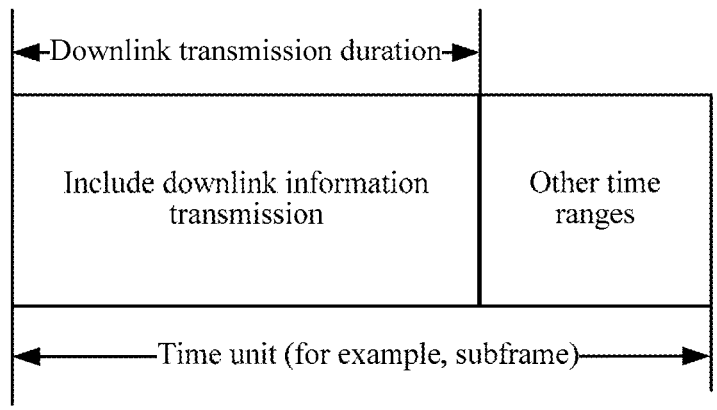
FIG. 9 is a schematic diagram of another example of a relationship between transmission duration and duration of a time unit according to an embodiment of the present application.
Figure 10:
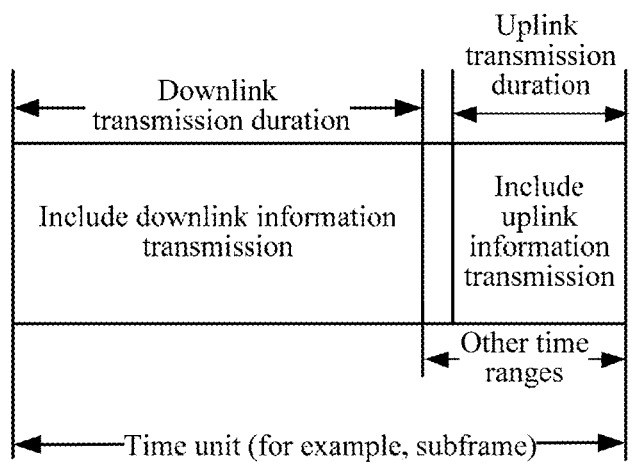
FIG. 10 is a schematic diagram of still another example of a relationship between transmission duration and duration of a time unit according to an embodiment of the present application.

It should be noted that in the embodiments of the present application, a length of the time unit used for information transmission (or information transmission duration) may be 1 ms, or may be less than 1 ms. Alternatively, in combination with the foregoing descriptions, even though for the LTE system that does not support the S-TTI, when the time unit is represented by a subframe, a length of the time unit used for downlink information transmission may be 1 ms, or may be less than 1 ms. Similarly, a length of the time unit used for uplink information transmission may be 1 ms, or may be less than 1 ms. For example, as shown in FIG. 8, a length of one time unit (for example, one subframe) used for downlink information transmission may be 1 ms. Alternatively, as shown in FIG. 9, a length of one time unit (for example, one subframe) used for downlink information transmission may be less than 1 ms. Alternatively, as shown in FIG. 10, when a length of one time unit used for downlink information transmission is less than 1 ms, other time ranges of the time unit may further include uplink information transmission.

For ease of understanding, the uplink information transmission method in the present application is described below by using an example in which a subframe is used as a time unit.

In addition, it should be noted that information transmission in an LTE system on an unlicensed band may not use a fixed frame structure. Generally, the access network device, for example, a base station or a cell, may determine, after successfully preempting an unlicensed spectrum resource, downlink information transmission duration and/or uplink information transmission duration based on downlink service load and/or uplink service load or another considered factor. Further, after successfully preempting the unlicensed spectrum resource, the access network device may flexibly adjust a quantity of time units including downlink information (that is, downlink time units), a quantity of time units including uplink information (that is, uplink time units), downlink information transmission duration included in each downlink time unit, and uplink information transmission duration included in each uplink time unit.

Figure 11:
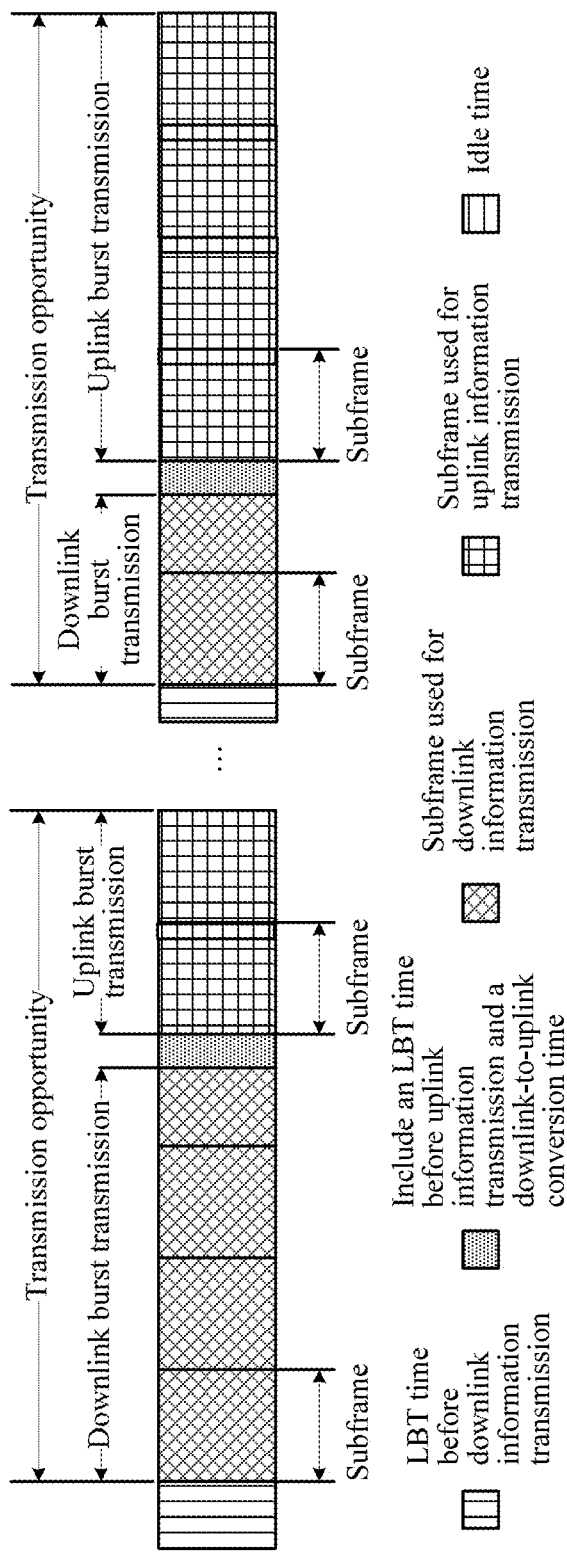
FIG. 11 is a schematic diagram of an example of an information transmission structure on an unlicensed band.

For example, an information transmission structure in the LTE system on the unlicensed band may be shown in FIG. 11. As shown in FIG. 11, a concept of a transmission opportunity (TxOP) is introduced into a frame structure in the LTE system on the unlicensed band. The transmission opportunity may also be referred to as a transmission burst. One TxOP may include a downlink transmission burst (DL Transmission Burst) and/or an uplink transmission burst (UL Transmission Burst).

The downlink transmission burst (which may also be referred to as a "downlink data transmission burst" or "downlink information transmission burst") may include information transmission (or data transmission) performed by the access network device (for example, an eNB) or a cell (Cell) serving the access network device, after successfully preempting an unlicensed band resource, by using the unlicensed band resource with no need to use the contention mechanism (for example, LBT). A time length of one downlink transmission burst is not greater than a maximum time for continuous transmission that can be performed by the access network device (or the cell) on the unlicensed band resource with no need to use the contention mechanism. The maximum time may also be referred to as a maximum channel occupancy time (MCOT). A length of the MCOT may be related to regional regulations and constraints. For example, in Japan, the MCOT may be equal to 4 ms, and in Europe, the MCOT may be equal to 8 ms, 10 ms, or 13 ms. Alternatively, a length of the MCOT may be related to a contention mechanism used by an interception device (for example, the access network device or the terminal device). Usually, a shorter interception time indicates a shorter MCOT. Further, alternatively, a length of the MCOT may be related to a level of a transmitted service. In the embodiments of the present application, the MCOT may also depend on another factor. This is not specifically limited.

It should be noted that in the foregoing descriptions, the "performing information transmission by using the unlicensed band resource with no need to use the contention mechanism" may include: After successfully preempting the unlicensed band resource, the access network device or the cell does not need to estimate, by using the contention mechanism in a time in which information is actually sent on the unlicensed band resource or in the MCOT, whether the unlicensed band resource is available. For example, as shown in FIG. 11, using a downlink transmission burst included in the 1st TxOP as an example, from the second subframe in the downlink transmission burst, the base station does not need to estimate, by using the contention mechanism, whether the unlicensed band resource is available. In other words, before the downlink data transmission burst, whether the unlicensed spectrum resource is available needs to be determined first. Once the downlink transmission burst starts, availability of the unlicensed spectrum resource may not be assessed again, until the downlink data transmission burst ends.

Figure 12:
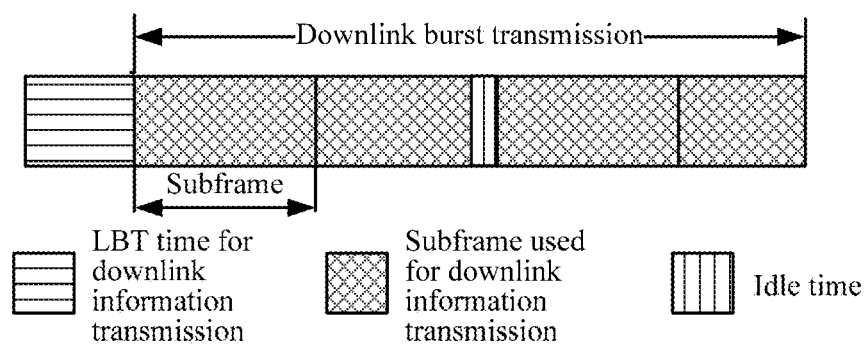
FIG. 12 is a schematic diagram of another example of an information transmission structure on an unlicensed band.

Alternatively, the "performing information transmission by using the unlicensed band resource with no need to use the contention mechanism" may include: After successfully preempting the unlicensed band resource, in a time in which information is actually sent on the unlicensed band resource or in the MCOT, the access network device or the cell may use the contention mechanism by considering intra-RAT coexistence instead of inter-RAT coexistence. Herein, the contention mechanism used for intra-RAT coexistence may include: After the unlicensed band resource is successfully preempted, the time in which the information is sent or the MCOT may include a particular time unit (or referred to as an idle time unit). In the particular time unit, the base station or the cell may stop information transmission (or may stop information sending). In the particular time unit, the base station or the cell may intercept a channel to assess again whether the unlicensed spectrum resource is available, or may not intercept a channel but continue sending information after the particular time unit in the time in which the information is sent or in the MCOT. As shown in FIG. 12, in a time range from the start to the end of the downlink transmission burst, the access network device may stop, at any time, sending information for a period of time. The time corresponds to an idle time unit in FIG. 12. In FIG. 12, that the idle time unit is located at the end of the second subframe is used as an example for description. The downlink transmission burst includes the idle time unit, so that another intra-RAT device and the base station can implement resource multiplexing on the unlicensed spectrum resource. Herein, for the LTE system, a non-LTE system such as a wireless local area network (WLAN, Wireless Local Area Network) system or a system using a wireless fidelity (WiFi, Wireless Fidelity) technology may be considered as an inter-RAT system. The LTE system may be considered as an intra-RAT system. Regardless of LTE systems belonging to a same operator or LTE systems belonging to different operators, the LTE systems may be considered as intra-RAT systems. Herein, the LTE system includes a base station and/or a terminal device.

Similarly, the uplink transmission burst (which may also be referred to as an "uplink data transmission burst" or "uplink information transmission burst") may include information transmission performed by the terminal device, after successfully preempting an unlicensed band resource, by using the unlicensed band resource with no need to use the contention mechanism (for example, LBT). For a single terminal device, a time length of an uplink transmission burst may be not greater than an MCOT on the unlicensed band resource, or may be limited in another manner. The uplink transmission burst may include information transmission of a single user or information transmission of a plurality of users. On a side of the access network device, the uplink transmission burst may be uplink information transmission included in the TxOP.

In addition, understanding of the "performing information transmission by using the unlicensed band resource with no need to use the contention mechanism" is the same as that on the side of the access network device, and details are not described herein again.

Figure 13:
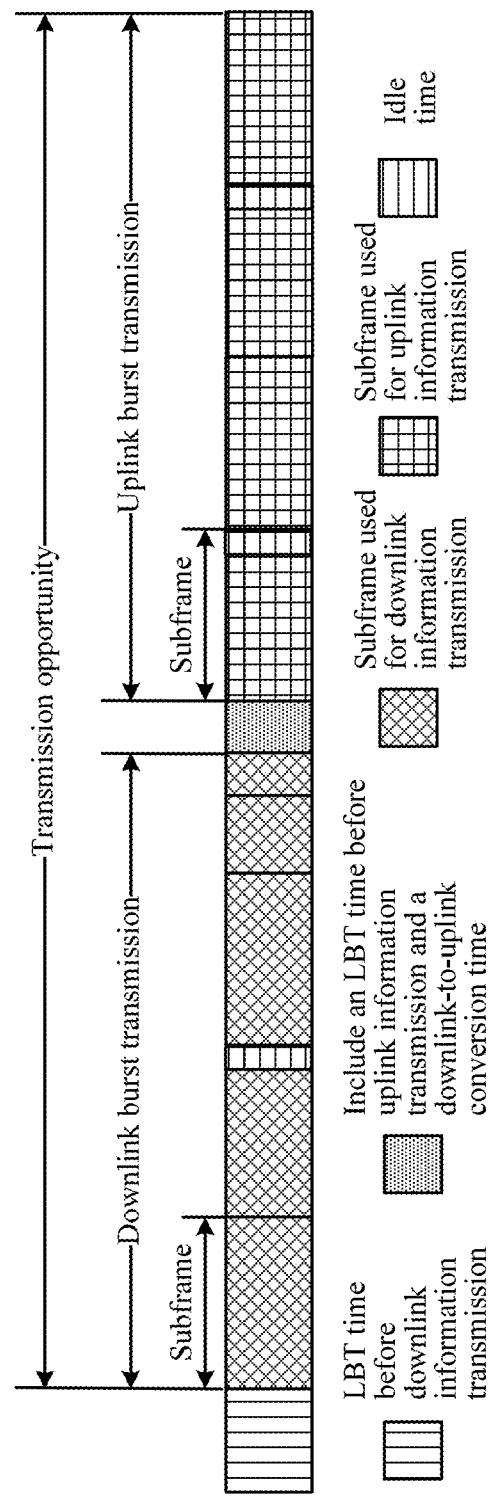
FIG. 13 is a schematic diagram of still another example of an information transmission structure on an unlicensed band.

For the terminal device, the intra-RAT system may further be understood as that other terminal devices have a serving cell or serving access network device the same as that of the terminal device. The uplink transmission burst further includes information transmission performed by the terminal device, based on a particular time delay (for example, based on a time delay of 4 ms), from the 1st uplink subframe that can be successfully scheduled to the last uplink subframe that can be successfully scheduled. The information transmission is performed after the access network device successfully preempts an unlicensed band resource and in a time range in which the access network device performs information transmission by using the unlicensed band with no need to the contention mechanism. As shown in FIG. 13, a time range (four subframes in FIG. 13) from the 1st uplink subframe to the last uplink subframe is a time range corresponding to the uplink transmission burst. It should be noted that FIG. 13 uses a subframe as an example for description. In the embodiments of the present application, a time length of the uplink subframe used for the uplink information transmission that can be successfully scheduled may be less than 1 ms.

In the embodiments of the present application, a time length of one TxOP may be not greater than a maximum transmission time length allowed by the downlink transmission burst or a maximum transmission time length allowed by the uplink burst, or not greater than a sum of a maximum transmission time length allowed by the downlink transmission burst and a maximum time length allowed by the uplink transmission burst. Alternatively, a time length of one transmission burst may be not greater than the MCOT on the unlicensed band resource. For example, after successfully preempting the unlicensed band resource, a maximum time length in which a given device such as the access network device, the terminal device, or another device can transmit data with no need to use the contention mechanism is 8 ms (corresponding to the MCOT mentioned above). In this case, even though one TxOP includes both a DL transmission burst and a UL transmission burst, a maximum transmission time length of the TxOP (or Transmission Burst) is still 8 ms. Advantages of this case include: The uplink transmission burst may use some contention mechanisms by using which an unlicensed band resource is easily successfully preempted.

As described above, the information transmission in the LTE system on the unlicensed band does not have a fixed frame structure, and may include at least one of the following: different downlink transmission bursts may have different duration, different uplink transmission bursts may have different duration, downlink transmission bursts included in different TxOPs (which may be or may not be adjacent to each other) may have different duration, and uplink transmission bursts included in different TxOPs may have different duration, that is, different TxOPs may have different duration, as shown in FIG. 11. In the embodiments of the present application, duration of the downlink transmission burst includes a time length from a start moment of a downlink burst to an end moment of the downlink burst, and duration of the uplink transmission burst includes a time length from a start moment of an uplink burst to an end moment of the uplink burst.

In the following, for ease of understanding and description, the transmission burst is referred to as a "burst" for short, the uplink transmission burst is referred to as an "uplink burst" for short, and the downlink transmission burst is referred to as a "downlink burst" for short. It should be noted that in FIG. 11 to FIG. 13, a region corresponding to "executing LBT before downlink transmission", a region corresponding to "executing LBT before uplink transmission", and an idle time unit are merely examples and are intended to explain that the access network device/the terminal device needs to determine, through LBT before information transmission, whether the unlicensed band resource is available. A specific location at which LBT is executed is not specifically limited in the present application. In addition, in FIG. 11 to FIG. 13, that a subframe is an information transmission unit is used for description. For information transmission on the unlicensed band, the information transmission unit may alternatively be one timeslot, or N OFDM symbols (for a normal cyclic prefix configuration, N may be less than 7; for an extended cyclic prefix configuration, N may be less than 6).

In addition, it should be noted that in the accompanying drawings related to the embodiments of the present application, the frame structure on the unlicensed band and how to determine a scheduling time sequence are mainly described. Therefore, some time units, some transmission bursts, some uplink transmissions, or some downlink transmissions in the accompanying drawings are drawn based on continuous information transmission, and a location at which the access network device performs clear channel assessment such as LBT may not be clearly marked. However, the present application is not limited thereto. The access network device may change a transmission structure (for example, the frame structure) based on usage of a resource (for example, whether LBT needs to be executed).

In addition, for ease of description, all the time units shown in the figures in the embodiments of the present application are described by using the subframe as an example. It should be noted that on the unlicensed band, an information transmission length of the uplink information transmission or the downlink information transmission may not be 1 ms.

In the embodiments of the present application, one transmission burst may include one or more time units.

In addition, when one transmission burst includes a plurality of time units, the plurality of time units in the transmission burst may be contiguous or non-contiguous (for example, there is a time interval between some adjacent time units). This is not particularly limited in the present application.

Optionally, a plurality of contiguous time units included in each transmission burst have a same time length.

That is, in the embodiments of the present application, each time unit in a transmission burst may be a complete time unit. The complete time unit means that a time length of the time unit used for downlink information transmission or uplink information transmission is equal to a time length of the time unit.

For example, each time unit in a downlink transmission burst may be a complete time unit. That is, the time units used for downlink information transmission in the downlink transmission burst have a same time length. For another example, each time unit in an uplink transmission burst is a complete time unit. That is, the time units used for uplink information transmission in the uplink transmission burst have a same time length.

Optionally, in a plurality of contiguous time units included in each transmission burst, at least two time units have different time lengths.

That is, in the embodiments of the present application, some time units in a transmission burst may be incomplete time units.

For example, the $1^{st}$ time unit in a downlink transmission burst may be an incomplete time unit. This may be understood as that a time length of the $1^{st}$ time unit used for downlink information transmission may be less than a length of the $1^{st}$ time unit. For example, the time unit is represented by a subframe. In this case, a time used for downlink information transmission in the $1^{st}$ subframe in a downlink transmission burst may be less than 1 ms. Alternatively, the last time unit in a downlink transmission burst may be an incomplete time unit. This may be understood as that a time length of the last time unit used for downlink information transmission may be less than a length of the last time unit. For example, the time unit is represented by a subframe. In this case, a time used for downlink information transmission in the last subframe in a downlink transmission burst may be less than 1 ms. Alternatively, both the $1^{st}$ time unit and the last time unit in a downlink transmission burst are incomplete time units.

For another example, the $1^{st}$ time unit in an uplink transmission burst may be an incomplete time unit. This may be understood as that a time length of the $1^{st}$ time unit used for uplink information transmission may be less than a length of the $1^{st}$ time unit. For example, the time unit is represented by a subframe. In this case, a time used for uplink information transmission in the $1^{st}$ subframe in an uplink transmission burst may be less than 1 ms. Alternatively, the last time unit in an uplink transmission burst may be an incomplete time unit. This may be understood as that a time length of the last time unit used for uplink information transmission may be less than a length of the last time unit. For example, the time unit is represented by a subframe. In this case, a time used for uplink information transmission in the last subframe in an uplink transmission burst may be less than 1 ms. Alternatively, both the $1^{st}$ time unit and the last time unit in an uplink transmission burst are incomplete time units.

In addition, in the embodiments of the present application, there may be a time interval between adjacent transmission bursts. For example, after a downlink burst ends, because the access network device may need to re-estimate whether an unlicensed spectrum resource is available, there may be one or more time units between the adjacent transmission bursts.

In the embodiments of the present application, a time unit in one transmission burst may be used to transmit data of one terminal device, or may be used to transmit data of a plurality of terminal devices. This is not particularly limited in the present application. For example, a plurality of terminal devices served by one access network device may receive, by using a time unit in one transmission burst in a manner such as frequency division multiplexing, time division multiplexing, or spatial multiplexing, data sent by the access network device. For another example, a plurality of terminal devices served by the access network device may send data to the access network device by using a time unit in one transmission burst in a manner such as frequency division multiplexing, time division multiplexing, or spatial multiplexing.

In the embodiments of the present application, each transmission burst may be divided (or statically configured or semi-statically configured) in advance. That is, each transmission burst is divided by a higher-layer management device of the communication system and notified to each access network device. Alternatively, a division manner of each transmission burst may be specified in a communication protocol. Alternatively, a division manner of each transmission burst may be prestored in each access network device through factory settings or administrator settings. For example, for a same unlicensed spectrum resource, each access network device may use the unlicensed spectrum resource in a time division multiplexing manner. A specific corresponding time range for use may be divided by the higher-layer management device. In the divided time range for use, channel assessment also needs to be performed to use the unlicensed spectrum resource.

Alternatively, in the embodiments of the present application, each transmission burst may be determined by each access network device (or dynamically changed). That is, each access network device may determine, through contention, a time unit that can be used, and may use one or more time units that are successfully contended as one or more transmission bursts. For example, the access network device may configure a plurality of time units that are successfully contended into one transmission burst.

Figure 14:
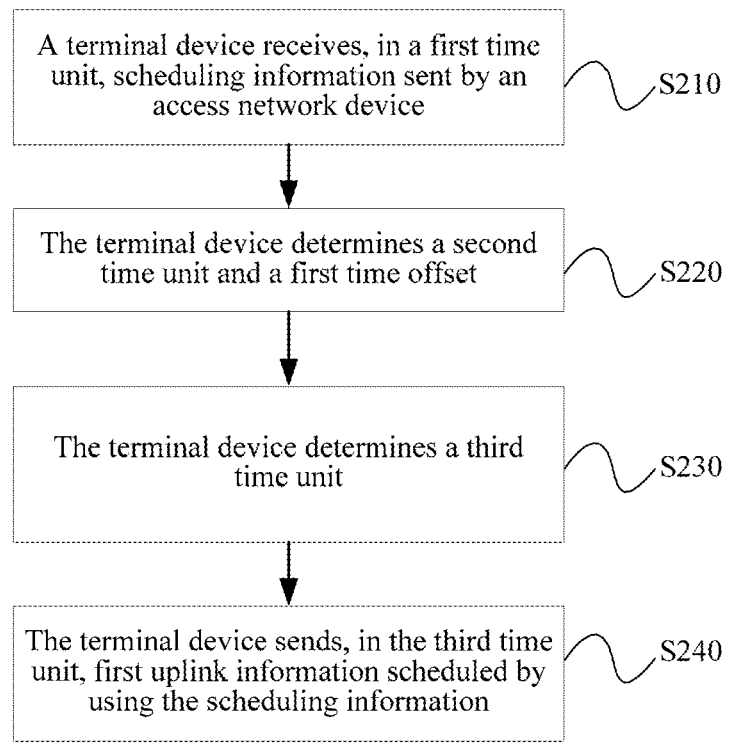
FIG. 14 is a schematic flowchart of an uplink information transmission method according to an embodiment of the present application.

FIG. 14 is a schematic flowchart of an uplink information transmission method 200 described from a perspective of a terminal device according to an embodiment of the present application.

As shown in FIG. 14, the method 200 includes the following steps.

S210. The terminal device receives, in a first time unit, scheduling information sent by an access network device.

S220. The terminal device determines a second time unit and a first time offset, where the second time unit is after the first time unit, and the second time unit carries downlink information sent by the access network device.

S230. The terminal device determines a third time unit, where the third time unit is a time unit that is offset from the second time unit by the first time offset.

S240. The terminal device sends, in the third time unit, first uplink information scheduled by using the scheduling information.

Specifically, when determining (for example, based on a request of a terminal device or an indication of a core network device) that one or more terminal devices need to send uplink information (including the first uplink information, or the first uplink information and second uplink information), the access network device may generate scheduling information for the uplink information.

The scheduling information may also be referred to as scheduling data, control information, control data, or the like, and may be used to indicate at least one of the following: a transmission format of the uplink information, resource allocation of the uplink information, an uplink scheduling grant of the uplink information, power control of the uplink information, retransmission information of the uplink information, or the like.

In this embodiment of the present application, the scheduling information may be a field or all information fields included in downlink control information (DCI), and may be carried on a physical downlink control channel (PDCCH) and/or an enhanced physical downlink control channel (EP-DCCH), or may be carried on another channel. This is not specifically limited in the present application.

In addition, the scheduling information may include scheduling information for the terminal device to transmit uplink information, for example, include a modulation and coding scheme (MCS), a frequency domain resource indicator used for transmitting the uplink information, power control information, and the like. The scheduling information may be terminal device-specific (UE specific) indication information. For example, the scheduling information is valid for only a terminal device or a user group. The scheduling information may alternatively be cell-specific indication information. For example, the scheduling information is valid for all terminal devices in a linked state in a cell or all terminal devices (including terminal devices in a linked state and terminal devices in an idle state) using the cell as a serving cell.

Optionally, in this embodiment of the present application, the scheduling information may be uplink grant (UL grant) control information. The scheduling information includes control information transmitted in DCI format 0 or DCI format 4.

In this embodiment of the present application, the scheduling information may instruct the terminal device to send uplink information in one time unit, or may instruct the terminal device to send uplink information in at least two time units. For example, one UE may be scheduled, by using one UL grant (or one piece of DCI) in the first time unit, to send uplink information in one or more third time units.

It should be understood that functions and effects of the foregoing enumerated scheduling information are merely an example for description. The present application is not limited thereto. Each parameter indicated by the scheduling information in the prior art falls within the protection scope of the present application.

In this embodiment of the present application, the downlink information (or downlink data) corresponds to information (or data) that is sent by the access network device, for example, an LTE base station, to the terminal device.

In addition, in this embodiment of the present application, the uplink information (or uplink data) corresponds to information (or data) that is sent by the terminal device to the access network device.

In this embodiment of the present application, the information or the data includes at least one of the following: service data, control data, and a reference signal. For example, the uplink information may include at least one of the following: service data that can be carried on a physical uplink shared channel (PUSCH), control data that can be carried on the PUSCH, control data that can be carried on a physical uplink control channel (PUCCH), an uplink demodulation reference signal (DMRS), and a sounding reference signal (SRS). The control data includes channel state information (CSI). The CSI may be periodic or aperiodic, and may further include a scheduling request (SR). Preferably, in this embodiment of the present application, the control data does not include hybrid automatic repeat request-acknowledgment information (HARQ-ACK). The HARQ-ACK may include acknowledgment information (ACK) or negative acknowledgement information (NACK).

For another example, the downlink information may include data carried on a downlink physical channel, and/or a downlink reference signal. The downlink physical channel includes at least one of the following: a physical downlink shared channel (PDSCH), a physical broadcast channel (PBCH), a physical multicast channel (PMCH), a physical control format indicator channel (PCFICH), a physical downlink control channel (PDCCH), a physical hybrid automatic repeat request indicator channel (PHICH), an enhanced physical downlink control channel (EPDCCH), and an MTC physical downlink control channel (MPDCCH). The downlink reference signal includes at least one of the following: a cell-specific reference signal (CRS), a multimedia broadcast multicast service single frequency network reference signal (MBSFN RS), a user equipment-specific reference signal used to demodulate data carried on the PDSCH (UE-specific Reference Signal, DM-RS), a reference signal used to demodulate data carried on the EPDCCH or the MPDCCH (DeModulation Reference Signal, DM-RS), a positioning reference signal (PRS), and a channel state information reference signal (CSI-RS).

In the following, for ease of understanding and description, it is assumed that the uplink information includes uplink information # A (that is, an example of the first uplink information) and/or uplink information # B (that is, an example of the second uplink information). The uplink information # A may be uplink information that needs to be sent by a terminal device # A (that is, an example of the terminal device), and the uplink information # B may be uplink information that needs to be sent by a terminal device # B (that is, another example of the terminal device). In this case, the terminal device # A and the terminal device # B may be a same terminal device, or may be different terminal devices. This is not particularly limited in the present application.

In addition, in the following, for ease of understanding and description, scheduling information for the uplink information # A is denoted as scheduling information # A (that is, the scheduling information # A belongs to the scheduling information), and scheduling information for the uplink information # B is denoted as scheduling information # B (that is, the scheduling information # B belongs to the scheduling information). It should be noted that in this embodiment of the present application, the scheduling information for the uplink information # A may be understood as that the terminal device sends the uplink information # A based on content included in the scheduling information, and the scheduling information for the uplink information # B may be understood as that the terminal device sends the uplink information # B based on content included in the scheduling information.

It should be noted that in this embodiment of the present application, the scheduling information # A and the scheduling information # B may be different information elements of same information, for example, carried in one UL grant or carried on one physical layer control channel. Alternatively, the scheduling information # A and the scheduling information # B may be independent information, for example, carried in different UL grants or carried on different physical layer control channels. This is not particularly limited in the present application. In addition, the scheduling information # A and the scheduling information # B may be transmitted by using a same time-frequency resource (for example, a time unit), or may be transmitted by using different time-frequency resources (for example, time units). This is not particularly limited in the present application.

Processes of transmitting the uplink information # A and the uplink information # B are separately described below.

First, the process of transmitting the uplink information # A is described.

In this embodiment of the present application, the access network device may send the scheduling information # A to the terminal device # A by using one or more time units (that is, an example of the first time unit, which, for ease of understanding and distinguishing, is denoted as a time unit # A1 below). Herein, a method for and a process of transmitting the scheduling information are similar to those in the prior art. To avoid repetition, details are omitted.

By way of example but not limitation, the terminal device # A and the access network device may further determine the time unit # A1 (that is, an example of the first time unit) carrying the scheduling information # A. Herein, the process may be similar to that in the prior art. To avoid repetition, details are omitted.

In addition, by way of example but not limitation, for example, the time unit # A1 (for example, one subframe) carries the scheduling information # A (which may be understood as that the access network device sends the scheduling information # A in the time unit # A1). If the time unit # A1 is one subframe, a time length of the time unit # A1 is 1 ms. A time length of the time unit # A1 used for downlink information transmission may be 1 ms, or may be less than 1 ms. This is not particularly limited in the present application. For another example, if the time unit # A1 is one subframe, a time length of the time unit # A1 is 1 ms. When a time length used of the time unit # A1 for downlink information transmission is less than 1 ms, other time ranges of the time unit # A1 may further be used for transmission of other information (for example, uplink information sent by some terminal devices).

In this embodiment of the present application, that the terminal device receives, in the time unit # A1, the scheduling information # A sent by the access network device may be understood as that the terminal device receives, in a time range of the time unit # A1 used for the downlink information transmission, the scheduling information # A sent by the access network device. As described above, the time length of the time unit # A1 used for the downlink information transmission may be equal to or less than the time length of the time unit # A1.

In this way, the terminal device # A can determine, based on the scheduling information # A, that the uplink information # A scheduled by using the scheduling information # A needs to be sent. In addition, as described above, the access network device can determine that the uplink information # A scheduled by using the scheduling information # A needs to be received.

Then, the terminal device # A and the access network device may determine one or more time units (that is, an example of the third time unit, which, for ease of understanding and distinguishing, is denoted as a time unit # A3 below) used to carry the uplink information # A.

In this embodiment of the present application, the terminal device # A and the access network device may determine the time unit # A3 based on a time unit (that is, an example of the second time unit, which, for ease of understanding and distinguishing, is denoted as a time unit # A2 below) after the time unit # A1 in a time domain.

First, a method for determining the time unit # A2 is described in detail.

In this embodiment of the present application, that the time unit # A2 carries the downlink information sent by the access network device may also be understood as that the time unit # A2 includes the downlink information sent by the access network device, or that the downlink information sent by the access network device is in the time unit # A2. A length of the time unit # A2 used for downlink information transmission may be 1 ms, that is, one subframe, or may be less than 1 ms. For example, the access network device sends the downlink information in a subframe m. A length of the subframe m used for downlink information transmission may be 1 ms, or may be less than 1 ms.

In this embodiment of the present application, that the time unit # A2 carries the downlink information sent by the access network device includes that a time range of the time unit # A2 used for downlink information transmission carries the downlink information sent by the access network device. As described above, a time length of the time unit # A2 used for the downlink information transmission may be equal to or less than the time length of the time unit # A2.

In this embodiment of the present application, the time length of the time unit (for example, # A1/# A2/# A3) is a time length from a start moment of the time unit to an end moment of the time unit. As described above, if one time unit is represented by one subframe, a time length of the time unit is equal to 1 ms. If one time unit is represented by one timeslot, a time length of the time unit is equal to 0.5 ms. If one time unit is represented by one or more OFDM symbols, a time length of the time unit is equal to a length of one or more OFDM symbols.

In this embodiment of the present application, the first time unit and the second time unit may belong to different downlink bursts (that is, Case 1), or belong to a same downlink burst (that is, Case 2). Manners of determining the second time unit (for example, the time unit #2) in the foregoing two cases are separately described below.

Case 1

Optionally, the first time unit belongs to a first downlink burst, the second time unit belongs to a second downlink burst, the second downlink burst is after the first downlink burst, and there are L downlink bursts between the second downlink burst and the first downlink burst, where L is an integer, and L≥0.

Figure 15:
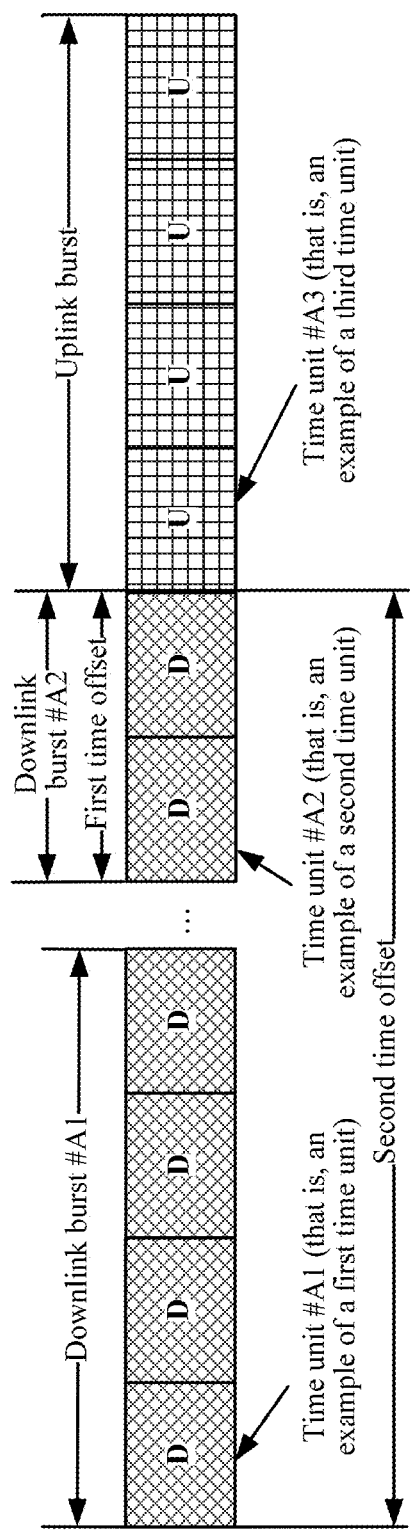
FIG. 15 is a schematic diagram of an example of an information transmission structure according to an embodiment of the present application.

Specifically, for example, as shown in FIG. 15, in this embodiment of the present application, the time unit # A1 belongs to a downlink burst # A1, the time unit # A2 belongs to a downlink burst # A2, and the downlink burst # A1 and the downlink burst # A2 are different downlink bursts. That is, as shown in FIG. 15, the downlink burst # A2 may be located after the downlink burst # A1 in the time domain.

In this embodiment of the present application, there may be L downlink bursts between the downlink burst # A2 and the downlink burst # A1, where L is an integer, and L≥0.

L may be determined in at least one of the following manners:

1. Pre-Configuration

That is, in this embodiment of the present application, the quantity L of downlink bursts between a downlink burst (that is, the first downlink burst) to which the first time unit belongs and a downlink burst (that is, the second downlink burst) to which the second time unit belongs may be specified in a standard protocol.

In this way, the terminal device and the access network device may determine, based on the quantity L specified in the standard protocol and the downlink burst (that is, the first downlink burst) to which the first time unit belongs, the downlink burst (that is, the second downlink burst) to which the second time unit belongs, thereby determining the second time unit in the second downlink burst.

Correspondingly, the terminal device # A and the access network device may determine the downlink burst # A2 based on the quantity L specified in the standard protocol and the downlink burst # A1, thereby determining the downlink burst to which the second time unit # A2 belongs.

2. Signaling Indication

That is, in this embodiment of the present application, the access network device may alternatively include, into the indication information (which, for ease of understanding and distinguishing, is denoted as indication information # A1), the quantity L of downlink bursts between a downlink burst (that is, the first downlink burst) to which the first time unit belongs and a downlink burst (that is, the second downlink burst) to which the second time unit belongs.

By way of example but not limitation, the indication information # A1 may be carried in physical layer signaling or higher layer signaling, such as Radio Resource Control (RRC) signaling or Media Access Control (MAC) signaling.

In this way, the terminal device # A may determine the quantity L based on the indication information # A1, and further determine the downlink burst # A2 based on the quantity L and the downlink burst # A1, thereby determining the downlink burst to which the time unit # A2 belongs.

Optionally, the terminal device determines, as the second time unit, a downlink time unit included in the $1^{st}$ downlink burst after the first downlink burst.

Specifically, in this embodiment of the present application, let L=0. In this case, the terminal device # A may use the $1^{st}$ downlink burst after the downlink burst # A1 as the downlink burst # A1.

Figure 16:
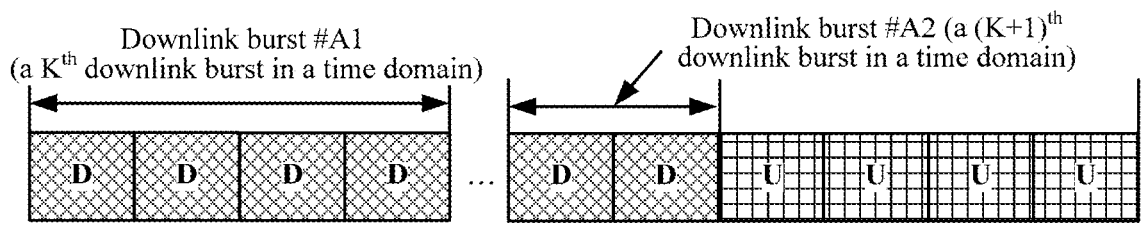
FIG. 16 is a schematic diagram of another example of an information transmission structure according to an embodiment of the present application.

By way of example but not limitation, for example, FIG. 16 shows a time sequence relationship between the downlink burst # A1 (that is, an example of the first downlink burst) and the downlink burst # A2 (that is, an example of the second downlink burst) when L=0.

It should be noted that in this embodiment of the present application, the terminal device determines L through pre-configuring or the signaling indication, to determine the downlink burst in which the second time unit is located. This is equivalent to that the terminal device determines, through pre-configuration or the signaling indication, that the second time unit is in the $(L+1)^{th}$ downlink burst after the first downlink burst.

The method for determining the time unit # A2 (that is, an example of the second time unit) in the downlink burst # A2 (that is, an example of the second downlink burst) in Case 1 is described below.

In this embodiment of the present application, the second time unit may be determined in at least one of the following manners:

A. Pre-Configuration

Optionally, the determining, by the terminal device, a second time unit includes:

determining, by the terminal device, the second time unit based on a first preset rule.

Specifically, in this embodiment of the present application, a location of the second time unit in the downlink burst (that is, the second downlink burst) to which the second time unit belongs may be specified in the standard protocol. This is an example of the first preset rule.

In this way, the terminal device and the access network device may use a time unit at the location that is in the second downlink burst and that is specified in the standard protocol as the second time unit.

Correspondingly, the terminal device # A and the access network device may use a time unit at a location that is in the downlink burst # A2 and that is specified in the first preset rule as the time unit # A2.

It should be noted that in this embodiment of the present application, the first preset rule and the foregoing manner of preconfiguring the quantity L may be determined by using a same rule. That is, the second downlink burst (for example, the downlink burst # A2) and the location of the second time unit (for example, the time unit # A2) in the second downlink burst may be specified by using a same preset rule. Alternatively, it may be understood as that a downlink time unit in the second downlink burst is determined as the second time unit by using a preset rule.

Alternatively, in this embodiment of the present application, the first preset rule and the foregoing manner of preconfiguring the quantity L may be determined by using different rules. That is, the second downlink burst (for example, the downlink burst # A2) may be specified by using one preset rule, and the location of the second time unit (for example, the time unit # A2) in the second downlink burst may be specified by using another preset rule.

It should be understood that the foregoing enumerated manners of determining the first preset rule are merely examples for description. The present application is not limited thereto. For example, the first preset rule may alternatively be determined by the terminal device and the access network device through negotiation, provided that second time units determined by the terminal device and the access network device are consistent.

In this embodiment of the present application, the preset rule may be specified in the standard protocol.

In this embodiment of the present application, optionally, that the terminal device determines the second time unit based on the first preset rule may be understood as that the second time unit is preconfigured.

For another example, the first preset rule may include: using, as the second time unit, a downlink time unit that includes common control information and that is in the $(L+1)^{th}$ downlink burst after a downlink burst in which the first time unit is located, or optionally, using, as the second time unit, a downlink time unit that includes common control information and that is in a downlink burst (which may also be understood as the $(L+1)^{th}$ downlink burst, where L=0) immediately after a downlink burst in which the first time unit is located. The common control information is used to indicate an end moment of the $(L+1)^{th}$ downlink burst, or optionally, the common control information is used to indicate an end moment of the downlink burst immediately after the downlink burst in which the first time unit is located. Further, the common control information is carried on a physical layer common control channel, and for example, is scrambled by using a cell-common radio network temporary identifier (CC-RNTI). Further, the common control information may be carried in common search space (CSS), or the common control information may be carried in user equipment-specific search space (USS). In this case, the determining, by the terminal device, the second time unit based on a first preset rule includes: using, by the terminal device as the second time unit, a downlink time unit that includes common control information and that is in the $(L+1)^{th}$ downlink burst after a downlink burst in which the first time unit is located, or optionally, using, by the terminal device as the second time unit, a downlink time unit that includes common control information and that is in a downlink burst immediately after a downlink burst in which the first time unit is located. The common control information is used to indicate an end moment of the downlink burst immediately after the downlink burst in which the first time unit is located. Further, when there are at least two downlink time units that include the common control information and that is in the downlink burst immediately after the downlink burst in which the first time unit is located, the first preset rule may further include: using the $M^{th}$ downlink time unit including the common control information as the second time unit.

B. Signaling Indication

Optionally, the determining, by the terminal device, a second time unit includes:

receiving, by the terminal device, second indication information sent by the access network device, where the second indication information is used to indicate the second time unit; and determining, by the terminal device, the second time unit based on the second indication information.

Specifically, in this embodiment of the present application, the access network device may further generate indication information (that is, an example of the second indication information, for example, indication information of a location of the second time unit in the second downlink burst, which, for ease of understanding and distinguishing, is denoted as indication information # A2 below) of the second time unit, and send the indication information # A2 to the terminal device.

By way of example but not limitation, the indication information # A2 may include physical layer signaling or higher layer signaling, such as Radio Resource Control (RRC) signaling or Media Access Control (MAC) signaling.

In this way, the terminal device # A may determine the time unit # A2 in the downlink burst # A2 based on the indication information # A2.

It should be noted that in this embodiment of the present application, the quantity L and the location of the second time unit in the second downlink burst may be indicated by same information. That is, the second downlink burst (for example, the downlink burst # A2) and the location of the second time unit (for example, the time unit # A2) in the second downlink burst may be indicated by one piece of indication information.

Alternatively, in this embodiment of the present application, the quantity L and the location of the second time unit in the second downlink burst may be indicated by different information. That is, the second downlink burst (for example, the downlink burst # A2) may be indicated by one piece of information, and the location of the second time unit (for example, the time unit # A2) in the second downlink burst may be indicated by another piece of information.

Alternatively, in this embodiment of the present application, a configuration rule for the quantity L may also be used in combination with the indication information of the location of the second time unit in the second downlink burst. For example, optionally, the second downlink burst (for example, the downlink burst # A2) may be indicated by one piece of information, and the location of the second time unit (for example, the time unit # A2) in the second downlink burst may be specified by using a preset rule. Optionally, the second downlink burst (for example, the downlink burst # A2) may be determined by using a preset rule, and the location of the second time unit (for example, the time unit # A2) in the second downlink burst may be determined by using the indication information.

Optionally, the second indication information and the scheduling information may be in same DCI. For example, the terminal device receives an uplink grant (UL grant) sent by the access network device. The UL grant includes the scheduling information and the second indication information, the scheduling information may include the scheduling information corresponding to the uplink information transmission, and the second indication information may be used to indicate the second time unit.

Alternatively, the second indication information and the scheduling information are in different DCI. For example, one piece of DCI includes the scheduling information corresponding to the uplink information transmission, and another piece of DCI indicates the second time unit. Alternatively, the second indication information is a field included in the scheduling information. For example, the scheduling information is information about a UL grant, such as control information transmitted in DCI format 0 or DCI format 4. Some fields included in the scheduling information may be used to indicate the second time unit.

Optionally, the second indication information may alternatively be the common control information. That is, the second time unit may be indicated by the common control information. In addition, in this embodiment of the present application, the common control information may be valid to a particular terminal device group (which, for example, may include a plurality of terminal devices).

Optionally, the terminal device may further determine the second time unit based on the first preset rule and the second indication information.

For example, the first preset rule includes: using, as the second time unit, a downlink time unit that includes common control information and that is in the $(L+1)^{th}$ downlink burst after a downlink burst in which the first time unit is located. The common control information is used to indicate an end moment of the downlink burst in which the first time unit is located, and is carried on a physical layer common control channel. When there are at least two downlink time units including the common control information, the scheduling information (that is, an example of the second indication information) may be used to specifically indicate a downlink time unit that includes the common control information and that is used as the second time unit.

It should be understood that the foregoing enumerated manners of determining the second time unit are merely examples for description. The present application is not limited thereto. For example, the foregoing manners A and B may be used in combination. For example, the first preset rule includes a plurality of configured locations of the second time unit. For example, the downlink time unit that includes the common control information and that is in the $(L+1)^{th}$ downlink burst after the downlink burst in which the first time unit is located is used as the second time unit, the $1^{st}$ downlink time unit in the $(L+1)^{th}$ downlink burst after the downlink burst in which the first time unit is located is used as the second time unit, the second to last downlink time unit in the $(L+1)^{th}$ downlink burst after the downlink burst in which the first time unit is located is used as the second time unit, or the last downlink time unit in the $(L+1)^{th}$ downlink burst after the downlink burst in which the first time unit is located is used as the second time unit. In this case, the second indication information may indicate a specific method for configuring the location of the second time unit.

By way of example but not limitation, in this embodiment of the present application, the location of the second time unit in the second downlink burst may be configured in the following manners.

That is, optionally, the second time unit is the $1^{st}$ downlink time unit in the second downlink burst; or the second time unit is the second to last downlink time unit in the second downlink burst; or the second time unit is the last downlink time unit in the second downlink burst.

Specifically, in this embodiment of the present application, the access network device and the terminal device # A may use the last or the second to last time unit in the downlink burst # A2 as the time unit # A2 (for example, based on a protocol specification and/or signaling-based negotiation).

For example, the protocol specification or the first preset rule may include: using, as the second time unit, the $1^{st}$ downlink time unit, the second to last downlink time unit, or the last downlink time unit in the downlink burst (which may also be understood as the $(L+1)^{th}$ downlink burst, where L=0) immediately after the downlink burst in which the first time unit is located. In this case, the determining, by the terminal device, the second time unit based on a first preset rule includes: using, by the terminal device as the second time unit, the $1^{st}$ downlink time unit, the second to last downlink time unit, or the last downlink time unit in the downlink burst immediately after the downlink burst in which the first time unit is located.

It should be noted that in this embodiment of the present application, the downlink time unit is a time unit including downlink information transmission, and descriptions are similar to the foregoing descriptions of the "time unit" (for example, the time unit # A1). A time length of the time unit used for downlink data transmission may be equal to or less than a time length of the time unit. Therefore, that "the second time unit is the $1^{st}$ downlink time unit in the second downlink burst" may be understood as that "the second time unit is the $1^{st}$ time unit in the second downlink burst and including downlink information transmission or including a resource that can be used for downlink information transmission".

For example, when the downlink time unit is represented by a subframe, assuming that the downlink time unit is a subframe n, duration used for downlink information transmission in the subframe n may be 1 ms, or may be less than 1 ms. It may be understood that in this embodiment of the present application, if the downlink time unit is represented by a subframe, that "the second time unit is the $1^{st}$ downlink time unit in the second downlink burst" may be understood as that "the second time unit is the $1^4$ subframe that is in the second downlink burst and that includes downlink information transmission or the $1^{st}$ subframe that is capable of downlink information transmission". A time length of the subframe used for the downlink information transmission may be less than or equal to 1 ms.

Similarly, in this embodiment of the present application, the uplink time unit is a time unit including uplink information transmission. A time length of the time unit used for the uplink information transmission may be equal to or less than a time length of the time unit.

If the second time unit is the $1^{st}$ downlink time unit in the second downlink burst, in addition to obtaining the foregoing described beneficial effects, not only a downlink time unit that exists between the first time unit and the third time unit and of which a location is uncertain is considered, to ensure that the access network device and the terminal device have a consistent understanding of the time unit in which the uplink information transmission is located or that the downlink information transmission is not affected, but also a delay between uplink information scheduling and the uplink information transmission can be reduced, thereby improving experience of the terminal device.

The second to last or the last downlink time unit in the second downlink burst is used as the second time unit, so that a quantity of downlink time units included in the second downlink burst can be dynamically adjusted, for example, be flexibly adjusted based on a downlink service requirement, thereby ensuring utilization of the unlicensed spectrum resource.

Case 2

Optionally, the first time unit belongs to a first downlink burst, and the second time unit belongs to the first downlink burst.

Figure 17:
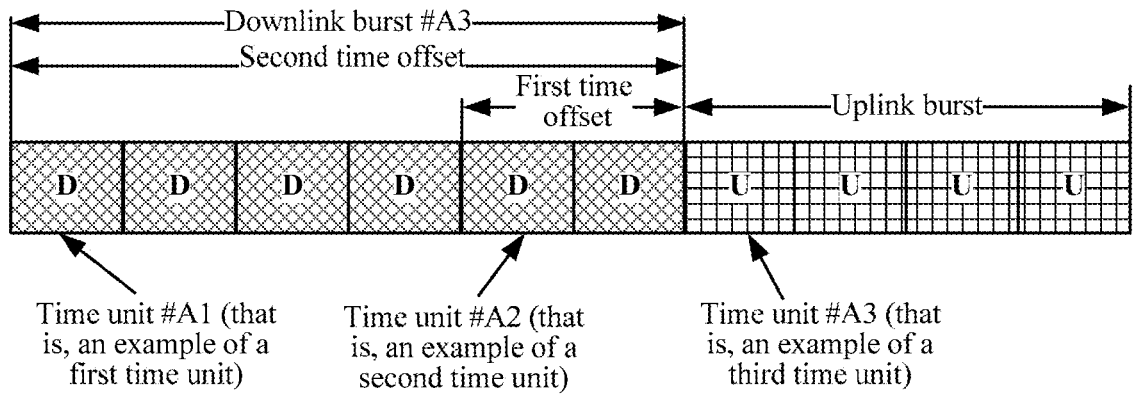
FIG. 17 is a schematic diagram of still another example of an information transmission structure according to an embodiment of the present application.

Specifically, for example, as shown in FIG. 17, in this embodiment of the present application, the time unit # A1 belongs to a downlink burst # A3, and the time unit # A2 also belongs to the downlink burst # A3.

In addition, the time unit # A2 (that is, an example of the second time unit) is another downlink time unit that is in the downlink burst # A3 (that is, an example of the first downlink burst) and that is different from the time unit # A1 (that is, an example of the first time unit).

Optionally, after successfully preempting a licensed spectrum resource, the access network device may send the scheduling information. When sending the scheduling information, the access network device may determine a specific quantity of downlink subframes included in the downlink burst that includes the first time unit. Alternatively, when sending the scheduling information, the access network device may not need to determine a specific quantity of downlink subframes included in the downlink burst that includes the first time unit.

For example, in this case, the first preset rule may include: using, as the second time unit, a downlink time unit that includes common control information and that is in the downlink burst in which the first time unit is located. The common control information is used to indicate an end moment of the downlink burst in which the first time unit is located. Further, the common control information is carried on a physical layer common control channel, and, for example, is scrambled by using a cell-common radio network temporary identifier (CC-RNTI). The first time unit does not include the common control information. In this case, the determining, by the terminal device, the second time unit based on a first preset rule includes: using, by the terminal device as the second time unit, a downlink time unit that includes common control information and that is in the downlink burst in which the first time unit is located. The common control information is used to indicate an end moment of the downlink burst in which the first time unit is located. Further, when there are at least two downlink time units that include the common control information and that is in the downlink burst in which the first time unit is located, the first preset rule may further include: using the $M^{th}$ downlink time unit including the common control information as the second time unit.

For another example, the first preset rule may include: using, as the second time unit, the last or the second to last downlink time unit in a downlink burst in which the first time unit is located. In this case, the determining, by the terminal device, the second time unit based on a first preset rule includes: using, by the terminal device as the second time unit, the last or the second to last downlink time unit in the downlink burst in which the first time unit is located.

For another example, the first preset rule includes: using, as the second time unit, a downlink time unit that includes common control information and that is in the downlink burst in which the first time unit is located. The common control information is used to indicate an end moment of the downlink burst in which the first time unit is located, and is carried on a physical layer common control channel. When there are at least two downlink time units including the common control information, the scheduling information (that is, an example of the second indication information) may be used to specifically indicate a downlink time unit that includes the common control information and that is used as the second time unit.

It should be understood that the foregoing enumerated manners of determining the second time unit are merely examples for description. The present application is not limited thereto. For example, the foregoing manners A and B may be used in combination. For example, the first preset rule includes a plurality of configured locations of the second time unit. For example, the downlink time unit that includes the common control information and that is in the downlink burst in which the first time unit is located is used as the second time unit, the $1^{st}$ downlink time unit in the downlink burst in which the first time unit is located is used as the second time unit, the second to last downlink time unit in the downlink burst in which the first time unit is located is used as the second time unit, or the last downlink time unit in the downlink burst in which the first time unit is located is used as the second time unit. In this case, the second indication information may indicate a specific method for configuring the location of the second time unit.

That is, in this embodiment of the present application, there may be Q time units between the time unit # A1 and the time unit # A2, where Q is an integer, and Q≥0.

By way of example but not limitation, optionally, there may be at least four downlink time units (that is, Q=4) between the second time unit and the first time unit. In other words, between the second time unit and the first time unit, there may be more than four time units (that is, Q>4) including the downlink information transmission.

Figure 18:
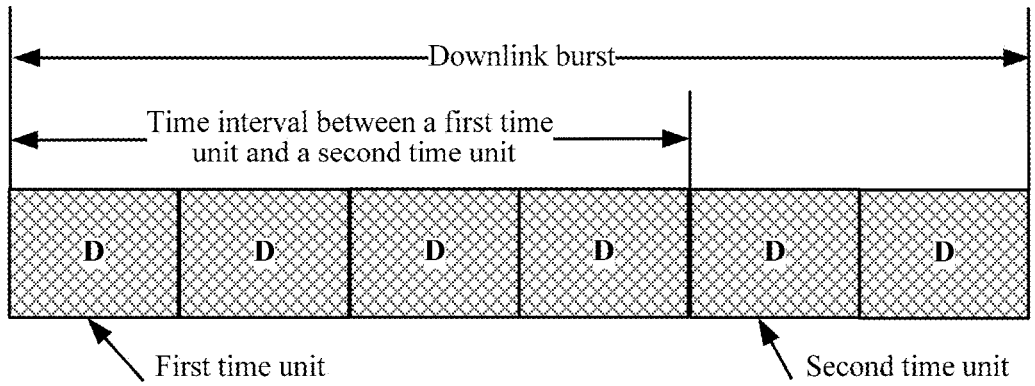
FIG. 18 is a schematic diagram of still another example of an information transmission structure according to an embodiment of the present application.

As shown in FIG. 18, a time range between the second time unit and the first time unit is a time range between an end moment of the first time unit and an end moment of the second time unit or a time range between a start moment of the first time unit and a start moment of the second time unit.

By way of example but not limitation, Q may be determined in at least one of the following manners:

1. Pre-Configuration

That is, in this embodiment of the present application, when the first time unit and the second time unit belong to a same downlink burst, the quantity Q of time units between the first time unit and the second time unit may be specified by using a standard protocol. That is, in this embodiment of the present application, the quantity Q may be specified by using the first preset rule.

In this way, the terminal device and the access network device may determine the second time unit based on the quantity Q specified in the standard protocol (that is, an example of the first preset rule) and the first time unit.

2. Signaling Indication

That is, in this embodiment of the present application, the access network device may alternatively include, into the indication information (which, for ease of understanding and distinguishing, is denoted as indication information # A3), the location of the first time unit in the first downlink burst, for example, the quantity Q of downlink bursts between the first time unit and the second time unit.

By way of example but not limitation, the indication information # A3 may include physical layer signaling or higher layer signaling, such as Radio Resource Control (RRC) signaling or Media Access Control (MAC) signaling.

In this way, the terminal device # A may determine the quantity Q based on the indication information # A3, and further, may determine the time unit # A2 based on the quantity Q and the time unit # A1.

Optionally, the second time unit is the second to last downlink time unit in the first downlink burst; or the second time unit is the last downlink time unit in the first downlink burst.

Specifically, in this embodiment of the present application, when the first time unit and the second time unit belong to a same downlink burst (that is, the first downlink burst), the access network device and the terminal device # A may determine the last or the second to last downlink subframe in the first downlink burst as the second time unit.

Optionally, the second time unit carries common control information, and the common control information is used to indicate an end moment of the downlink burst to which the second time unit belongs.

Specifically, the terminal device uses a time unit that is in the first downlink burst and that includes the common control information as the second time unit. The common control information is used to indicate an end moment of the downlink burst in which the second time unit is located. Further, if the terminal device detects that at least two time units include the common control information, the terminal device may determine any one of the at least two time units as the second time unit, or determine, based on a preset rule, a particular time unit including the common control information as the second time unit. For example, the terminal device may determine, as the second time unit, the last or the second to last detected time unit in which the common control information is located.

Optionally, the second time unit includes the common control information, and the common control information is used to indicate an end moment of the second downlink burst.

Based on the uplink information transmission method according to this embodiment of the present application, when the first time unit and the second time unit are in the same downlink burst, a quantity of downlink time units in the downlink burst including the first time unit and the second time unit can be dynamically adjusted, for example, be flexibly adjusted based on a downlink service requirement, thereby ensuring utilization of the unlicensed spectrum resource. Optionally, the second to last or the last downlink time unit in the first downlink burst is used as the second time unit, so that a quantity of downlink time units included in the downlink burst can have a maximum dynamic adjustment range, thereby more flexibly using the unlicensed spectrum resource. For example, the quantity of downlink time units can be dynamically adjusted to the greatest extent based on the downlink service requirement.

It should be understood that the foregoing described "common control information" may be scrambled by using a common radio network temporary identifier (RNTI). For example, if the second time unit is a time unit on the unlicensed band, the common control information may be a CC-RNTI. The common control information may be carried on a physical layer common control channel.

Optionally, the common control information may be carried in common search space (CSS), or the common control information may be carried in user equipment-specific search space (USS).

After determining the time unit # A2 (that is, an example of the second time unit) as described above, the terminal device # A and the access network device may determine, based on the time unit # A2, a time unit (that is, an example of the third time unit, which, for ease of understanding and distinguishing, is denoted as the time unit # A3 below) used to transmit the uplink information # A scheduled by using the scheduling information # A.

In this embodiment of the present application, there is a time offset #α (that is, an example of the first time offset) between the time unit # A3 (that is, an example of the first time unit) and the time unit # A2.

In this embodiment of the present application, the time offset includes a time interval between start moments of different time units, or may include a time interval between end moments of different time units, and may be represented by an integer quantity of subframes, an integer quantity of OFDM symbols, or an integer quantity of timeslots, or in another manner.

In this embodiment of the present application, the first time offset includes a time interval (or a time delay) between the start moment of the second time unit and a start moment of the third time unit, or the first time offset includes a time interval (or a time delay) between the end moment of the second time unit and an end moment of the third time unit, or the first time offset includes a time delay between a start moment used for downlink information transmission in the second time unit and a start moment used for uplink information transmission in the third time unit, or the first time offset includes a time delay between an end moment used for downlink information transmission in the second time unit and a start moment used for uplink information transmission in the third time unit, or the first time offset includes a time delay between an end moment used for downlink information transmission in the second time unit and an end moment used for uplink information transmission in the third time unit. That a subframe is the time unit is used as an example for description. A time offset between a subframe n and a subframe m may be represented as m-n subframes, where m is not less than n.

In this embodiment of the present application, if the time unit is represented by a subframe, assuming that a subframe index corresponding to the second time unit is n, and the first time offset may be represented by X subframes or directly represented by X, a subframe index corresponding to a time unit that is offset from the second time unit by the first time offset is n+X, where X is an integer not less than 0.

Using FIG. 15 as an example, the first time offset is two subframes, and the first time offset is represented by a time interval between start moments of different time units. Descriptions of another time offset appearing in this embodiment of the present application are similar, and details are not described herein again. When the second time unit and the third time unit are a same time unit, the first time offset may be understood as 0.

It should be noted that herein, it is assumed that the second time unit is represented by a subframe n, and the third time unit is represented by a subframe m. As described above, a time length of the subframe n used for downlink information transmission may be less than a time length of the subframe n, that is, less than 1 ms, a time length of the subframe m used for uplink information transmission may be less than a time length in the subframe m, that is, less than 1 ms. Therefore, although a time offset between the subframe n and the subframe m may be represented as m-n subframes, a time length of the m-n subframes may be different from (m-n) 1 ms.

For example, as shown in FIG. 10, the second time unit and the third time unit may be represented by a same subframe. If the first time offset is represented by (m-n) subframes, the first time offset is 0. However, actually, based on FIG. 10, a time delay between a start moment used for downlink information transmission in the subframe and a start moment used for uplink information transmission in the subframe n is not 0.

A process of determining the time offset #α by the access network device and the terminal device # A is described in detail below.

In this embodiment of the present application, the time offset #α (that is, an example of the first time offset) may be M time units, where M≥0. That is, in this embodiment of the present application, the first time offset may correspond to M or the M time units. For example, if the second time unit is the $n^{th}$ time unit, the third time unit is the $(n+M)^t$ time unit. Assuming that a subframe index of the second time unit is n, a subframe of the third time unit is n+M. Alternatively, for another example, if the second time unit is the $n^{th}$ time unit, the third time unit is the $M^{th}$ time unit after the second time unit.

That is, alternatively, in this embodiment of the present application, the access network device and the terminal device # A may determine the $M^{th}$ time unit after the time unit # A2 (that is, an example of the second time unit) as the time unit # A3 (that is, an example of the third time unit).

Alternatively, the access network device and the terminal device # A may determine the $M^{th}$ time unit that includes a resource used for uplink information transmission and that is after the time unit # A2 as the time unit # A3.

Alternatively, the access network device and the terminal device # A may determine the $M^{th}$ time unit that includes uplink information transmission and that is after the time unit # A2 as the time unit # A3.

It should be noted that in this embodiment of the present application, including uplink (or downlink) information transmission does not necessarily represent that uplink (or downlink) information transmission definitely occurs in the time unit. This is because whether corresponding information transmission occurs also depends on impact of a channel assessment result. It should be noted that in this embodiment of the present application, after the second time unit may be understood as after an end moment of the downlink information transmission included in the second time unit. It may be understood that if the time length of the second time unit used for the downlink information transmission is equal to the time length of the second time unit, after the second time unit may be understood as after the end moment of the second time unit. If the time length of the second time unit used for the downlink information transmission is less than the time length of the second time unit, after the second time unit may be understood as after an end moment of the time length of the second time unit used for the downlink information transmission. It should be noted that a length of the $M^{th}$ time unit, that includes the resource used for the uplink information transmission, or the $M^{th}$ time unit that includes the uplink information transmission may be equal to or less than 1 ms.

That the time unit is one subframe is used as an example. Assumed that M=1, a relationship between the second time unit (corresponding to a part including the downlink information transmission) and the third time unit (corresponding to a part including the uplink information transmission) may be shown in FIG. 10. In this case, although the third time unit is the $1^{st}$ time unit after the second time unit, wherein $1^{st}$ time unit includes the uplink information transmission, because the second time unit and the third time unit are in a same subframe, if a relationship between subframe indexes is used to represent the first time offset, it may be considered that the first time offset is 0. In other words, if the first time offset is 0, it may be understood as that the second time unit and the third time unit are a same time unit. Alternatively, a relationship between the second time unit and the third time unit may also be shown in FIG. 17 or FIG. 19. In this case, the first time offset is greater than 0. If one subframe is used to represent one time unit, it may be understood as that a difference between a subframe index corresponding to the second time unit and a subframe index corresponding to the third time unit is equal to the first time offset.

Figure 19:
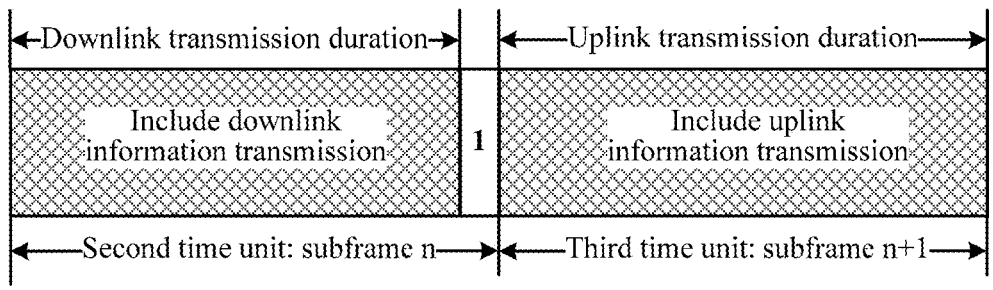
FIG. 19 is a schematic diagram of still another example of an information transmission structure according to an embodiment of the present application.

In FIG. 19, for the terminal device, a part marked "1" includes at least a conversion time from downlink receiving to uplink sending, and may further include a time part for the terminal device to perform channel assessment before performing data transmission in a subframe n+1. It should be noted that the part marked "1" may also be located at the beginning of the subframe n+1. This is not specifically limited in the present application.

By way of example but not limitation, M (or the time offset #α, that is, an example of the first time offset) may be determined in at least one of the following manners:

1. Pre-Configuration

Optionally, the method further includes:

determining, by the terminal device, the first time offset based on a second preset rule.

Specifically, in this embodiment of the present application, M may be preconfigured or be specified in a protocol.

By way of example but not limitation, for example, the $1^{st}$ time unit after the second time unit may be determined as the third time unit through predefinition or a protocol specification (that is, an example of the second preset rule). In this case, if the second time unit and the third time unit are a same time unit (which may be understood as that one time unit includes both downlink information transmission and uplink information transmission in this embodiment of the present application), M=0. If the second time unit and the third time unit are different time units (for example, corresponding to different subframe indexes), M=1.

In this way, the terminal device and the access network device may determine the third time unit based on M specified in the standard protocol and the second time unit.

Correspondingly, the terminal device # A and the access network device may determine the time unit # A3 based on the quantity M specified in the standard protocol and the time unit # A2.

2. Signaling Indication

Optionally, the method further includes:

receiving, by the terminal device, third indication information sent by the access network device, where the third indication information is used to indicate the first time offset; and determining, by the terminal device, the first time offset based on the third indication information.

Specifically, in this embodiment of the present application, the access network device may alternatively include M into indication information (that is, an example of the third indication information, which, for ease of understanding and distinguishing, is denoted as indication information # A4 below).

By way of example but not limitation, the indication information # A4 may include physical layer signaling or higher layer signaling, such as Radio Resource Control (RRC) signaling or Media Access Control (MAC) signaling.

In this way, the terminal device # A may determine the quantity M based on the indication information # A4, and further, may determine the time unit # A3 based on the quantity M and the time unit # A2.

In this manner, the terminal device receives the third indication information sent by the access network device, and determines, as the third time unit based on the second time unit and the first time offset indicated by the third indication information, a time unit that is after and offset from the second time unit by the first time offset. Alternatively, the terminal device determines, based on the second time unit and M indicated by the third indication information, the $M^{th}$ time unit after the second time unit as the third time unit.

It should be noted that in this embodiment of the present application, optionally, the third indication information and the scheduling information are in a same time unit. Further, the third indication information and the scheduling information may be carried in same or different DCI. The third indication information may alternatively be a field included in the scheduling information.

Optionally, the third indication information may be information included in physical layer common control signaling, and may be carried on the physical layer common channel. The indication information included in the indication signaling may be scrambled by using a common radio network temporary identifier (RNTI), for example, a CC-RNTI.

Optionally, the third indication information may alternatively be carried in the second time unit. Further, in this embodiment of the present application, M or the first time offset may be indicated by the common control information included in the second time unit. The common control information is used to indicate the end moment of the downlink burst in which the second time unit is located, and for example, is common control information scrambled by using the CC-RNTI.

3. M May be Determined by the Terminal Device Through Blind Detection.

Specifically, the terminal device determines a fifth time unit based on the first time unit and a third time offset. The fifth time unit is associated with only the first time unit. In addition, by way of example but not limitation, the third time offset may be preconfigured.

The third time offset herein may represent a time offset between a location of an uplink subframe that can be scheduled by using the scheduling information and the first time unit in an LTE system for a user who supports version 13 or below. For example, in a frequency division duplex system, the third time offset is 4 ms or four subframes. It is assumed that the terminal device receives the scheduling information in a subframe k, the terminal device may determine the fifth time unit as a subframe k+4.

In this case, the terminal device may determine that a quantity of time units between the fifth time unit and the end moment of the downlink burst in which the first time unit is located is M.

Figure 22:
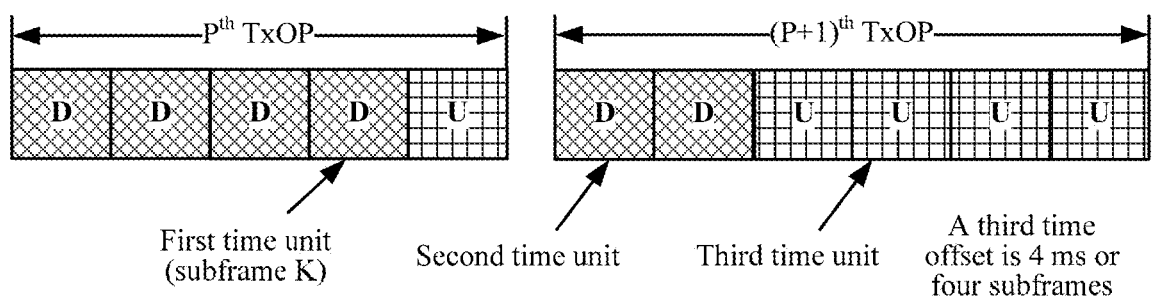
FIG. 22 is a schematic diagram of still another example of an information transmission structure according to an embodiment of the present application.

As shown in FIG. 22, the first time unit is the subframe k, according to a current LTE protocol whose version is not higher than version 13, in the FDD system, the scheduling information included in the subframe k indicates the subframe k+4. If the terminal device determines the $P^{th}$ TxOP ends in a subframe k+1, the terminal device may determine that M=3, that is, M=(k+4)−(k+1). The terminal device determines that the $3^{rd}$ time unit after the second time unit is the third time unit. In FIG. 22, the second time unit is the $1^{st}$ downlink subframe in the $(P+1)^{th}$ TxOP.

Correspondingly, the terminal device # A and the access network device may determine a time unit # A5 (that is, an example of the fifth time unit) based on a location of the time unit # A3 in the downlink burst # A1 and the time offset #β (that is, an example of the third time offset, which, for example, may be 4 ms). In addition, the terminal device # A and the access network device may determine the last time unit (which, for ease of understanding and distinguishing, is denoted as a time unit # A6 below) in the downlink burst # A1. In this way, the terminal device # A and the access network device may determine the time offset #α (for example, a specific value of M) based on an offset (or a time interval) between the time unit # A6 and the time unit # A5, and further determine the time unit # A3 based on the time unit # A2 and the time offset #α. It should be noted that in the foregoing manner of determining the time offset #α, the downlink burst # A2 (including the time unit # A2) may be the $1^{st}$ downlink burst after the downlink burst # A1.

As described above, the terminal device # A and the access network device can determine the time unit # A3, and send the uplink information # A in the time unit # A3.

In this embodiment of the present application, a length of the third time unit (for example, the time unit # A3) used for uplink information transmission in may be 1 ms, or may be less than 1 ms. That the third time unit is a subframe is used as an example. That the terminal device sends the first uplink information in the third time unit, for example, the subframe n may be understood as that the terminal device sends the first uplink information in a duration range of the subframe n used for the uplink information transmission. Optionally, when a time length of the second time unit used for downlink information transmission is less than 1 ms, and a time length the third time unit used for uplink information transmission is less than 1 ms, the second time unit and the third time unit may be a same time unit, for example, may be a same subframe. For example, as shown in FIG. 10, in a subframe carrying uplink information and downlink information, for the access network device, a part between downlink information transmission and uplink information transmission includes at least a conversion time from downlink sending to uplink receiving. In the subframe carrying both the uplink information and the downlink information, for the terminal device, the part between the downlink information transmission and the uplink information transmission includes at least a conversion time from downlink receiving to uplink sending.

It should be noted that in this embodiment of the present application, that the terminal device sends the first uplink information in the third time unit may be understood as that the terminal device determines that the first uplink information scheduled by using the scheduling information needs to be sent in the third time unit. However, for whether sending can be performed, clear channel assessment (CCA) may further need to be performed, for example, through LBT. Whether the first uplink information can be sent in the third time unit is determined based on a CCA assessment result.

In addition, in this embodiment of the present application, that the terminal device sends the first uplink information in the third time unit may further alternatively be understood as that the terminal device sends the first uplink information in a time range of the third time unit used for uplink information transmission. As described above, the time length of the third time unit used for the uplink information transmission may be equal to or less than a time length of the third time unit.

It should be understood that in this embodiment of the present application, because the second time unit is located after the first time unit, and the third time unit is located after the second time unit, the third time unit is located after the first time unit. That is, there is a time offset (which, for ease of understanding and distinguishing, is denoted as a second time offset) between the first time unit and the third time unit.

In addition, because there is the first time offset between the second time unit and the third time unit, and the second time unit is located after the first time unit, the second time offset is related to the first time offset (or the location of the second time unit). That is, the second time offset varies with the first time offset (or the location of the second time unit).

That is, in this embodiment of the present application, the second time offset between the first time unit and the third time unit is associated with the second time unit.

Alternatively, the second time offset between the first time unit and the third time unit is associated with the second time unit.

Specifically, the location of the second time unit changes, or index information corresponding to the second time unit changes. If the time unit is represented by a subframe, that the "index information corresponding to the second time unit changes" may be understood as that "a subframe index of the second time unit" changes.

Optionally, in this embodiment of the present application, the change in the location of the second time unit is caused by a different moment that is determined by the access network device through channel assessment (for example, LBT) and at which the unlicensed spectrum resource can be used; and/or in this embodiment of the present application, the change of the location of the second time unit is caused by uncertainty of a downlink data transmission (for example, duration of a downlink data transmission) included in the downlink burst.

In this embodiment of the present application, the change of the location of the second time unit may alternatively be caused by another factor. This is not specifically limited. To more clearly describe the change of the location of the second time unit, time information on a licensed spectrum is used as a reference, to observe time information on an unlicensed spectrum.

Figure 20:
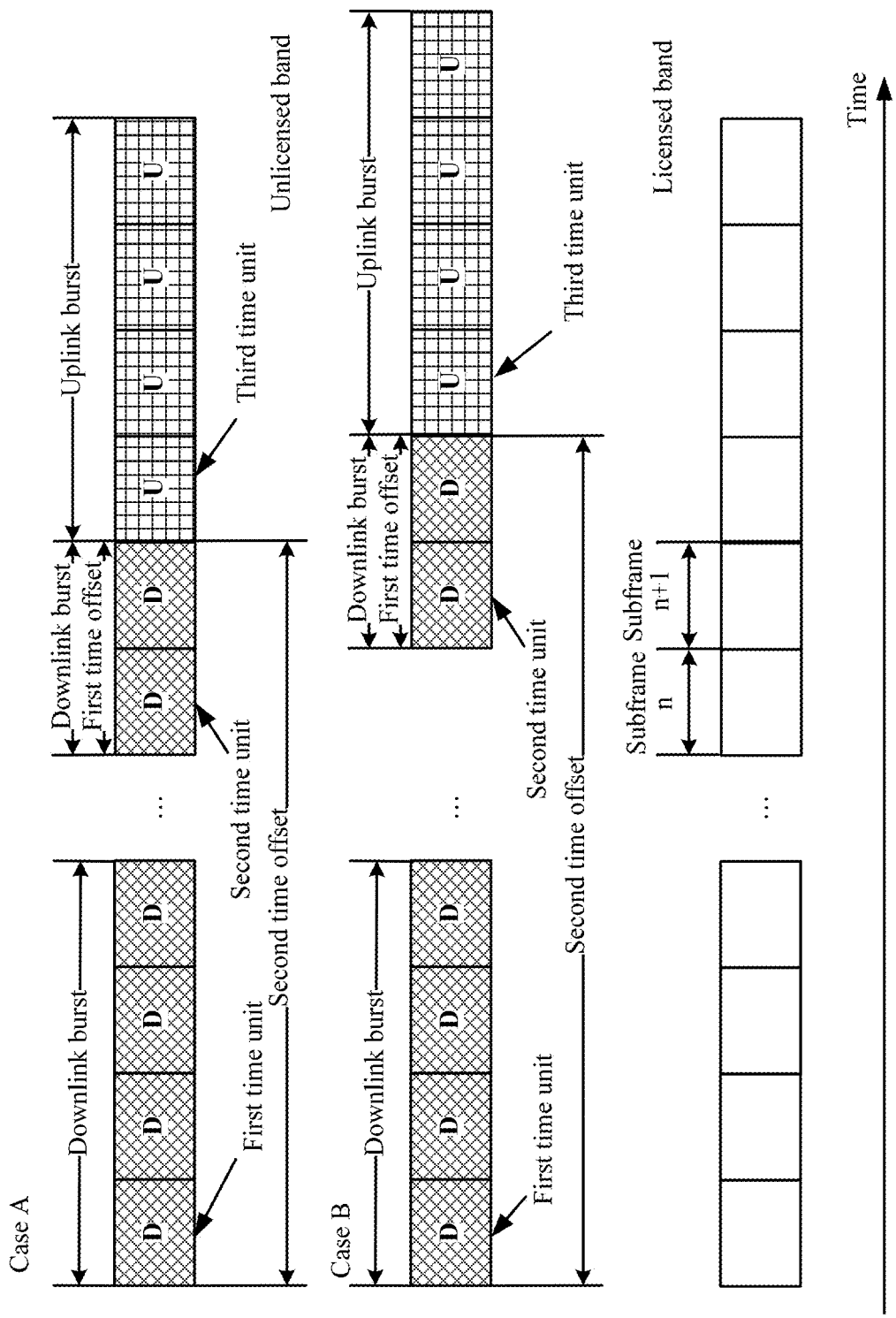
FIG. 20 is a schematic diagram of still another example of an information transmission structure according to an embodiment of the present application.

As shown in FIG. 20, it is assumed that subframe boundaries of a licensed spectrum and an unlicensed spectrum are aligned, or subframe indexes of subframes corresponding to a licensed spectrum and an unlicensed spectrum are the same (that is, Case A).

Alternatively, as shown in FIG. 20, it is assumed that the second time unit is the $1^{st}$ time unit in a downlink burst, and the second time unit and the first time unit are in different downlink bursts (that is, Case B).

For Case A and Case B, because the access network device can determine, before a subframe n, that an unlicensed spectrum resource can be used, a subframe index of the second time unit is the subframe n.

In addition, for Case A and Case B, because the access network device cannot determine, before the subframe n, that an unlicensed spectrum resource can be used, but can determine, before a subframe n+1, that the unlicensed spectrum resource can be used, a subframe index of the second time unit is the subframe n+1. Therefore, it can be observed that, although the second time unit is the $1^{st}$ time unit in the downlink burst, due to impact of an LBT assessment result, the location of the second time unit changes. Correspondingly, a location of the third time unit determined based on the second time unit also changes. Therefore, it may be understood that the second time offset is associated with the location of the second time unit.

Figure 21:
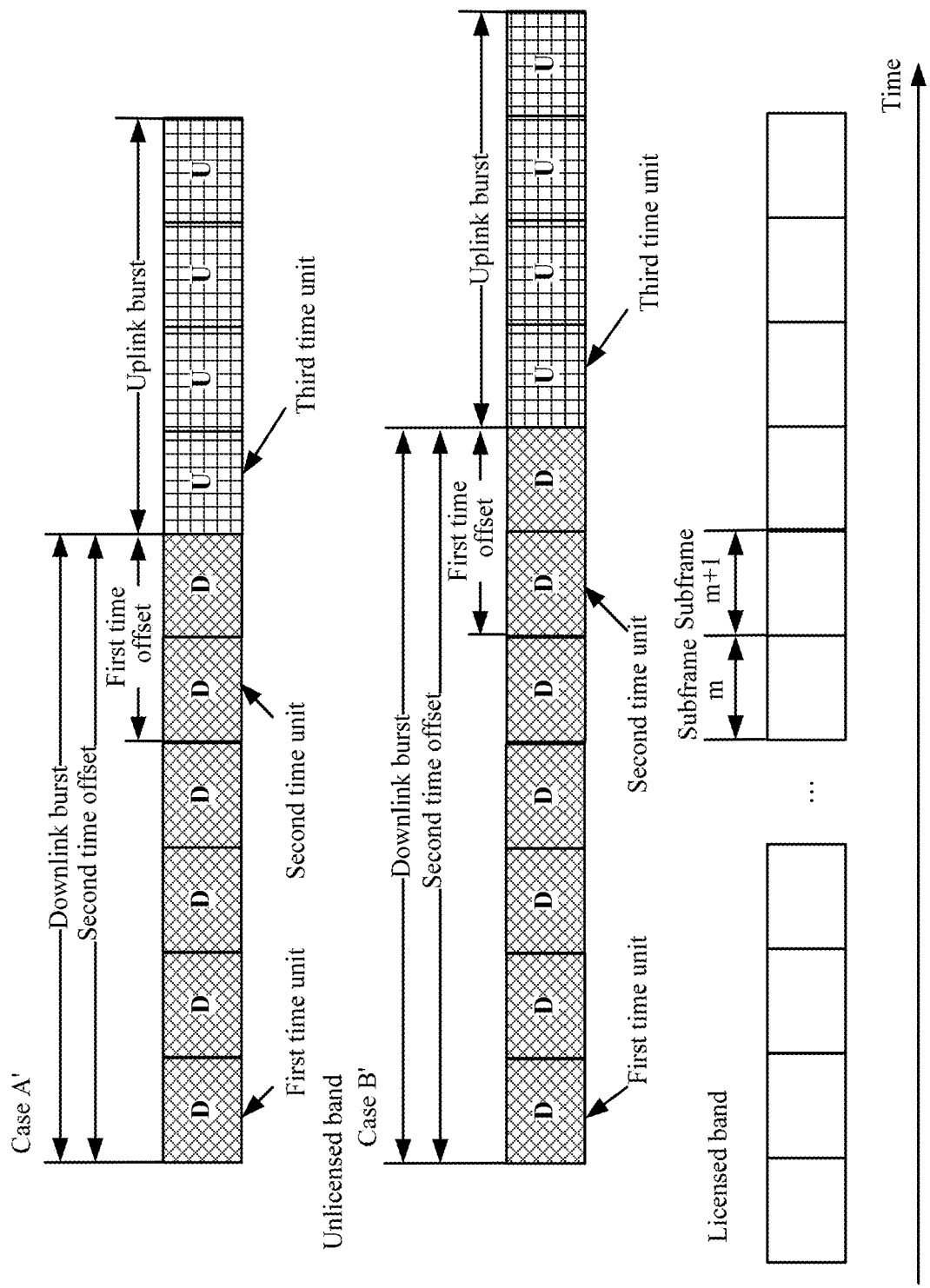
FIG. 21 is a schematic diagram of still another example of an information transmission structure according to an embodiment of the present application.

For another example, as shown in FIG. 21, it is still assumed that subframe boundaries of a licensed spectrum and an unlicensed spectrum are aligned, or subframe indexes of subframes corresponding to a licensed spectrum and an unlicensed spectrum are the same. It is assumed that the second time unit is the second to last downlink time unit in the downlink burst in which the second time unit is located, and the second time unit and the first time unit are in a same downlink burst. In this case, because the downlink burst includes an uncertain quantity of downlink time units, the location of the second time unit changes. As shown in FIG. 21, according to a specific quantity of downlink time units included in the downlink burst, a subframe index of the second time unit may be a subframe m (Case A') or a subframe m+1 (Case B').

For another example, it is assumed that the second time unit is the last downlink time unit in the downlink burst in which the second time unit is located, and the second time unit and the first time unit are in different downlink bursts. In this case, because a start location of the downlink burst in which the second time unit is located is affected by LBT, the location of the second time unit is uncertain. Alternatively, because a start location of the downlink burst in which the second time unit is located is affected by LBT and is uncertain, and the downlink burst in which the second time unit is located includes an uncertain quantity of downlink time units, although the second time unit is the last downlink time unit in the downlink burst in which the second time unit is located, time information corresponding to the second time unit changes. For example, a subframe index changes.

Optionally, an uplink burst to which the third time unit belongs is after a downlink burst to which the second time unit belongs, and the uplink burst to which the third time unit belongs is adjacent to the downlink burst to which the second time unit belongs.

Specifically, for example, as shown in FIG. 15 or FIG. 17, the uplink burst in which the third time unit is located is next to the downlink burst in which the second time unit is located. It may be understood that for the second time unit determined based on such a feature, an uncertain quantity of downlink time units between the first time unit and the third time unit, and an uncertain location of a downlink time unit caused by clear channel assessment may be fully considered, thereby ensuring that the access network device and the terminal device have a consistent understanding of the location of the third time unit, or ensuring downlink data transmission flexibility to the greatest extent. Herein, the downlink data transmission flexibility includes: The access network device can adaptively adjust the quantity of downlink time units based on a downlink service requirement, and it can be ensured that an expected quantity of downlink time units is not affected by a clear channel assessment result.

The process of transmitting the uplink information # B is described below.

Optionally, the terminal device determines a fourth time unit. There is a preset second time offset between the fourth time unit and the first time unit.

The terminal device sends, in the fourth time unit, second uplink information scheduled by using the scheduling information.

Specifically, in this embodiment of the present application, the access network device may send the scheduling information # B to the terminal device # B by using one or more time units (that is, another example of the first time unit, which, for ease of understanding and distinguishing, is denoted as a time unit # B below). Herein, a process of transmitting the scheduling information is similar to that in the prior art. To avoid repetition, details are omitted.

In addition, in this embodiment of the present application, the time unit # B and the time unit # A may be the same or different. This is not particularly limited in the present application.

By way of example but not limitation, the terminal device # A and the access network device may further record a time unit # B1 (that is, another example of the first time unit) carrying the scheduling information # B.

In addition, by way of example but not limitation, for example, a length of the time unit # B1 (for example, a length is one subframe) used for transmitting the scheduling information # B may be 1 ms, or may be less than 1 ms. This is not particularly limited in the present application. For another example, when a length of the time unit # B1 used for transmitting the scheduling information # B in is less than 1 ms, other time ranges of the time unit # B1 may further be used for other information (for example, other scheduling information, or uplink information sent by some terminal devices).

It should be noted that in this embodiment of the present application, the time unit # B1 and the foregoing time unit # A1 may be the same or different. This is not particularly limited in the present application.

In this embodiment of the present application, that the terminal device receives, in the time unit # B1, the scheduling information # B sent by the access network device may be understood as that the terminal device receives, in a time range of the time unit # B1used for downlink information transmission, the scheduling information # B sent by the access network device. As described above, the time length of the time unit # B1 used for the downlink information transmission may be equal to or less than a time length of the time unit # B1.

In this way, the terminal device # B can determine, based on the scheduling information # B, that the uplink information # B scheduled by using the scheduling information # B needs to be sent. In addition, as described above, the access network device can determine that the uplink information # B scheduled by using the scheduling information # B needs to be received.

Then, the terminal device # B and the access network device may determine one or more time units (that is, an example of the fourth time unit, which, for ease of understanding and distinguishing, is denoted as a time unit # B4 below) used to carry the uplink information # B.

In this embodiment of the present application, the terminal device # A and the access network device may determine the time unit # A3 based on the time unit # B1 and a preset time offset y (that is, an example of the second time offset).

That is, in this embodiment of the present application, there is the preset second time offset between the fourth time unit (for example, the time unit # B4) and the first time unit (for example, the time unit # B1). For example, in the FDD system, the second time offset may be 4 ms or four subframes.

Then, the terminal device # B and the access network device may transmit the uplink information # B in the foregoing determined time unit # B4.

Figure 23:
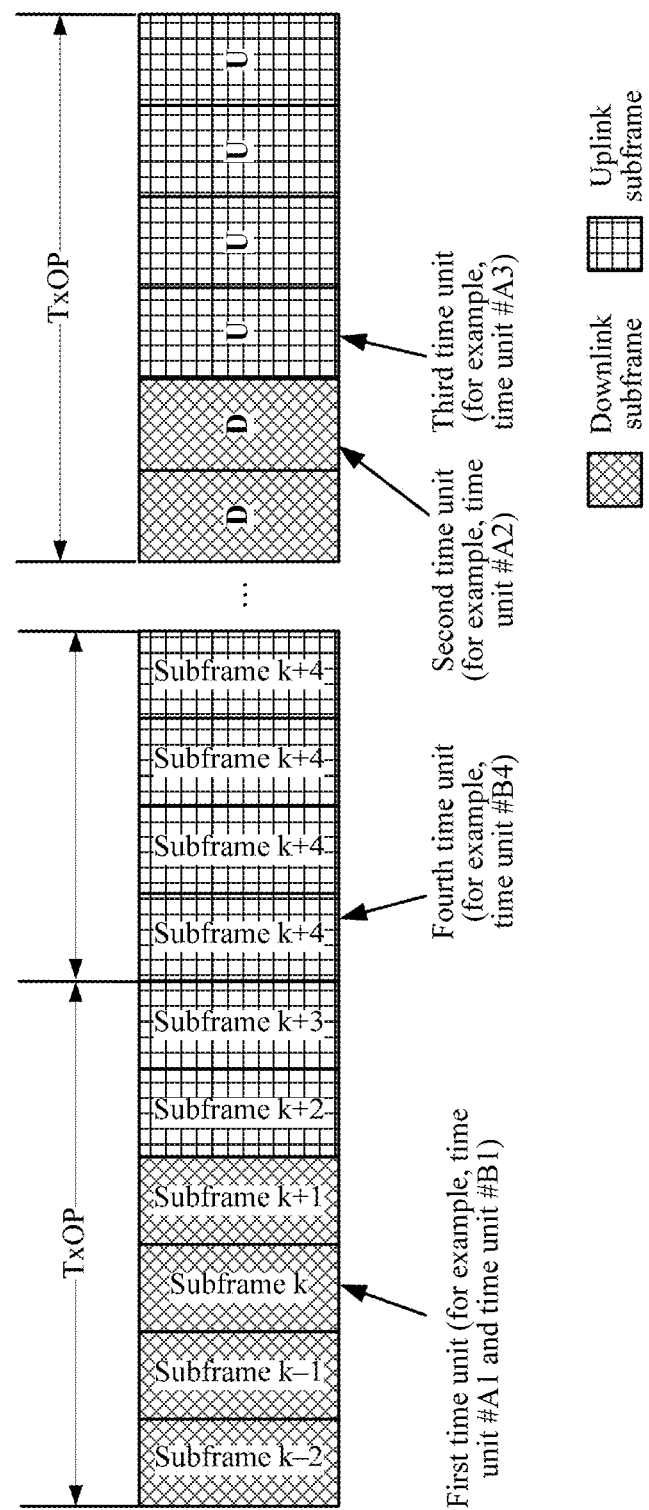
FIG. 23 is a schematic diagram of an example of a manner of determining a third time unit according to an embodiment of the present application.

In this embodiment of the present application, the processes of transmitting the uplink information # A and the uplink information # B may be performed separately or in parallel. This is not particularly limited in the present application. For example, FIG. 23 shows a process of transmitting the uplink information # A and the uplink information # B in parallel.

Optionally, the terminal device receives configuration information sent by the access network device. The configuration information is used to indicate that the third time unit is determined based on the second time unit.

The determining, by the terminal device, a third time unit includes:

determining, by the terminal device, the third time unit based on the configuration information.

Specifically, as described above, the terminal device # A and the terminal device # B may be a same terminal device. In this case, a time unit (for example, the third time unit) used to transmit uplink information may be determined based on the second time unit, or a time unit (for example, the fourth time unit) used to transmit uplink information may be determined based on the first time unit. Therefore, in this embodiment of the present application, before the terminal device determines the time unit used to transmit the uplink information, a transmission mode (denoted as a target transmission mode) used to transmit the uplink information may further be determined first, and the time unit used to transmit the uplink information is determined based on the target transmission mode.

In this embodiment of the present application, two transmission modes, a transmission mode # A (that is, an example of a first transmission mode) and a transmission mode # B (that is, an example of a second transmission mode), may be provided.

In the transmission mode # A, that is, a transmission mode corresponding to the uplink information # A, the time unit used to transmit the uplink information may be determined based on the second time unit.

In the transmission mode # B, that is, a transmission mode corresponding to the uplink information # B, the time unit used to transmit the uplink information may be determined based on the first time unit.

That is, in this embodiment of the present application, the terminal device # A may further first determine whether the transmission mode (that is, an example of the target transmission mode) corresponding to the uplink information # A is the foregoing transmission mode # A, and perform the foregoing processing process when determining that the transmission mode corresponding to the uplink information # A is the foregoing transmission mode # A.

By way of example but not limitation, in this embodiment of the present application, the target transmission mode may be determined in the following manners.

Manner X

In this embodiment of the present application, the access network device may send, to the terminal device (for ease of understanding, the terminal device # A is used as an example for description below), indication information (that is, an example of the configuration information, which, for ease of understanding, is denoted as fourth indication information below) used to indicate the target transmission mode (for ease of understanding, the target transmission mode for the uplink information # A is used as an example for description below).

In this way, the terminal device # A may send the uplink information # A when determining that the target transmission mode is the transmission mode # A.

Alternatively, the terminal device receives the configuration information sent by the access network device. The configuration information is used to indicate, to the terminal device, that the third time unit is determined based on the second time unit.

It should be noted that in this embodiment of the present application, both the fourth indication information and the scheduling information may be carried in the first time unit. For example, the fourth indication information and the scheduling information may be in same or different DCI. Alternatively, the fourth indication information may be a field in the scheduling information.

Optionally, the fourth indication information includes 1-bit information, and is used to indicate, to the terminal device, a transmission mode corresponding to uplink information transmission scheduled by using the scheduling information. For example, when a value of the information is 1 or 0, it may indicate that the third time unit is determined based on the second time unit. Alternatively, it may indicate that the transmission mode corresponding to the uplink information transmission scheduled by using the scheduling information is the first transmission mode. In this transmission mode, the terminal device determines, based on the second time unit, the third time unit carrying the uplink information transmission. Correspondingly, when a value of the information is 0 or 1, it may indicate that a transmission mode corresponding to the uplink information transmission scheduled by using the scheduling information is the second transmission mode. In this transmission mode, the terminal device determines, based on the first time unit, the third time unit carrying the uplink information transmission.

Optionally, the fourth indication information may be the scheduling information, and when the scheduling information includes indication information (that is, the third indication information) of the first time offset, the terminal device may determine that the transmission mode # A is the target transmission mode (that is, the transmission mode used to transmit the uplink information scheduled by using the scheduling information).

Optionally, the fourth indication information may further include the indication information (for example, the indication information # A2) of the second time unit. If the terminal device receives the indication information, the terminal device may determine that the transmission mode # A is the target transmission mode (that is, the transmission mode used to transmit the uplink information scheduled by using the scheduling information).

Manner Y

The terminal device may alternatively detect a structure of the time domain resource, and determine a transmission mode based on a detection result.

For example, the terminal device may determine a TxOP (which, for ease of understanding and description, is denoted as a first TxOP below) to which the first time unit carrying the scheduling information belongs, and detect whether the first TxOP includes the third time unit.

When the terminal device determines that the first TxOP does not include the third time unit, and there is at least one downlink time unit between the first TxOP and the third time unit, the terminal device may determine that the transmission mode # A is the target transmission mode (that is, the transmission mode used to transmit the uplink information scheduled by using the scheduling information). Further, the terminal device may determine the third time unit based on the second time unit and the first time offset.

In a possible implementation, optionally, the terminal device receives fifth indication information sent by the access network device. The fifth indication information indicates whether there is at least one downlink time unit between the first TxOP to which the first time unit belongs and the third time unit.

Specifically, the terminal device may receive indication information (that is, an example of the fifth indication information) that is sent by the access network device and that is used to indicate whether the first TxOP includes the third time unit, and determines, based on the fifth indication information, whether the first TxOP includes the third time unit.

By way of example but not limitation, in this embodiment of the present application, the scheduling information and the fifth indication information may be carried in same DCI or on a same PDCCH or EPDCCH, or may be carried in different DCI or on different PDCCHs or EPDCCHs. This is not particularly limited in the present application.

That the scheduling information and the fifth indication information are carried in same DCI is used as an example. The terminal device may receive information about a UL grant sent by the access network device, and the UL grant includes the scheduling information that is used to instruct the terminal device to perform uplink information transmission, such as a time-frequency resource location and a modulation and coding scheme (Modulation Coding Scheme, MCS). In addition, the UL grant may further include indication information (that is, an example of the fifth indication information) indicating whether the uplink information transmission performed by the terminal device is cross-TxOP scheduling (for example, Inter-TxOP scheduling) or non-cross-TxOP scheduling (for example, Intra-TxOP scheduling).

In this embodiment of the present application, the cross-TxOP scheduling may mean that the first time unit and the time unit in which the uplink information scheduled by using the scheduling information is located do not belong to a same TxOP.

Correspondingly, the non-cross-TxOP scheduling may mean that the first time unit and the time unit in which the uplink information scheduled by using the scheduling information is located belong to a same TxOP.

For example, as shown in FIG. 15, the uplink information (that is, information sent in the third time unit) scheduled by using the scheduling information included in the first time unit belongs to the non-cross-TxOP scheduling.

In FIG. 15, the downlink burst in which the first time unit is located may be considered as one TxOP. Apparently, the third time unit is not in the TxOP. If the UE determines that scheduled uplink data transmission is the non-cross-TxOP scheduling, the UE may determine that the time unit including the uplink data transmission and the time unit in which the UL grant is located do not belong to a same TxOP. Herein, "the time unit in which the UL grant is located" may be understood as the first time unit, "the time unit including the uplink data transmission" may be understood as the third time unit. If the UE determines that the first time unit and the third time unit do not belong to a same TxOP, it is equivalent to that the UE determines that a TxOP in which the first time unit is located does not include the third time unit.

In another possible implementation, optionally, the terminal device determines an end moment of the first TxOP to which the first time unit belongs, and determines, through blind detection, whether there is at least one downlink time unit between the first TxOP and the third time unit.

The terminal device may determine the end moment of the first TxOP. The terminal device determines an uplink time unit (which, for ease of understanding and description, is denoted as a time unit # X) based on the first time unit and a preconfigured time offset (which, for ease of understanding and distinguishing, is denoted as a fourth time offset, for example, 4 ms or four subframes). In other words, the time unit # X is a time unit that is offset from the first time unit by the fourth time offset.

If the determined time unit # X is after the end moment of the first TxOP, the terminal device and the access network device may determine that the first TxOP does not include the third time unit.

For example, if the terminal device and the access network device determine that the end moment of the first TxOP is a moment included in the subframe n, where the moment included in the subframe n is any moment from a start moment of the subframe n to an end moment of the subframe n. For ease of description, the end moment of the subframe n is used as the end moment of the first TxOP.

Herein, the fourth time offset may represent a time offset between a location of an uplink subframe that can be scheduled by using the scheduling information and the first time unit in an LTE system for a user who supports version 13 or below. For example, in a frequency division duplex (Frequency Division Duplex) system, the fourth time offset is 4 ms or four subframes.

It is assumed that the terminal device receives the scheduling information in the subframe k, the terminal device may determine that the time unit # X is the subframe k+4.

If the subframe k+4 is after the subframe n in terms of time, the terminal device may determine that the first TxOP does not include the third time unit.

Figure 24:
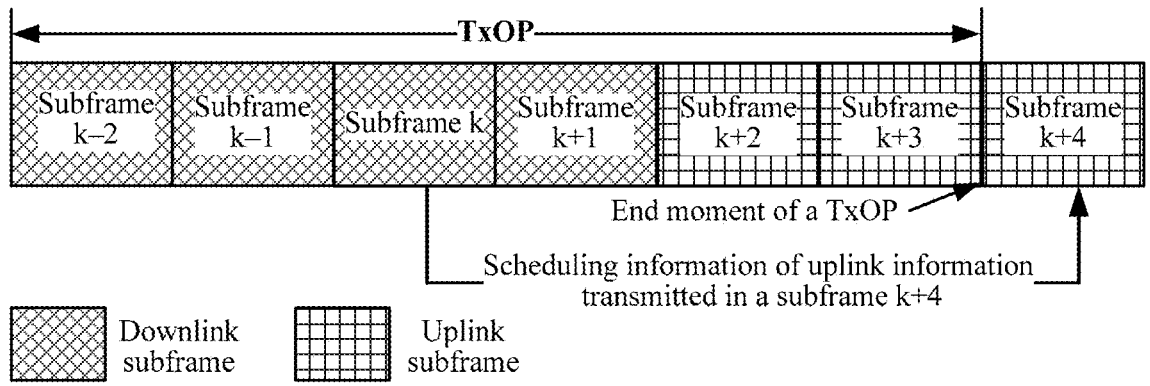
FIG. 24 is a schematic diagram of another example of a manner of determining a third time unit according to an embodiment of the present application.

As shown in FIG. 24, in FIG. 24, a subframe k+3 is the subframe n. In this implementation, the terminal device may determine the end moment of the first TxOP through blind detection and/or signaling indication. For example, the UE may determine, by blindly detecting existence of a downlink reference signal such as a cell-common reference signal (Cell-common Reference Signal, CRS), the end moment of the first TxOP or an end moment of a downlink data transmission burst included in the first TxOP. For another example, the terminal device may determine, by receiving the indication information sent by the access network device, the end moment of the first TxOP or an end moment of an uplink data transmission burst included in the first TxOP.

Based on the uplink information transmission method in this embodiment of the present application, before the third time unit is determined, the target transmission mode is determined, so as to improve transmission reliability and accuracy.

In addition, in this embodiment of the present application, a first frequency at which the first time unit is located and a second frequency at which the third time unit may be the same or different. This is not particularly limited in the present application.

Figure 25:
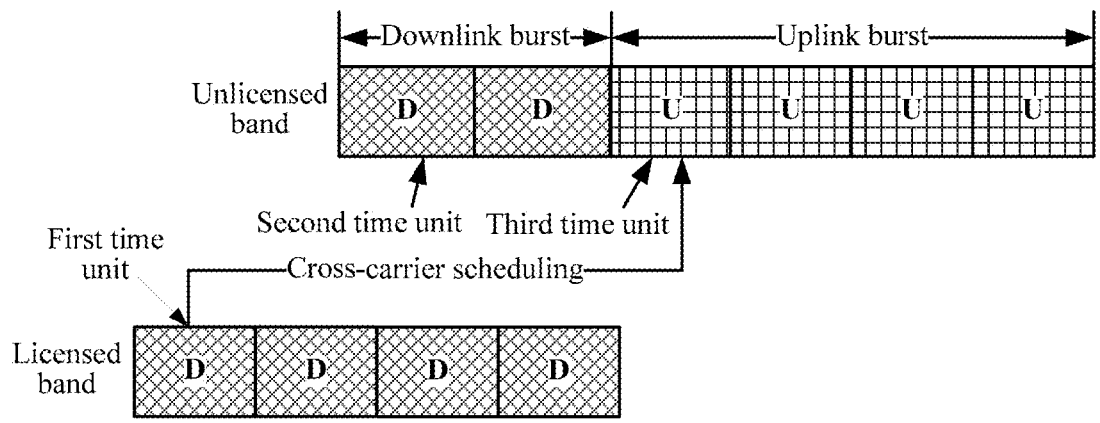
FIG. 25 is a schematic diagram of still another example of a manner of determining a third time unit according to an embodiment of the present application.

If the two frequencies are the same, self-carrier scheduling (Self-carrier scheduling) may be corresponded to. If the two frequencies are different, cross-carrier scheduling (Cross-carrier scheduling) may be corresponded to. FIG. 25 shows a manner of cross-carrier scheduling.

In addition, in this embodiment of the present application, a third frequency at which the second time unit is located and the second frequency may be the same or different. This is not particularly limited in the present application.

Figure 26:
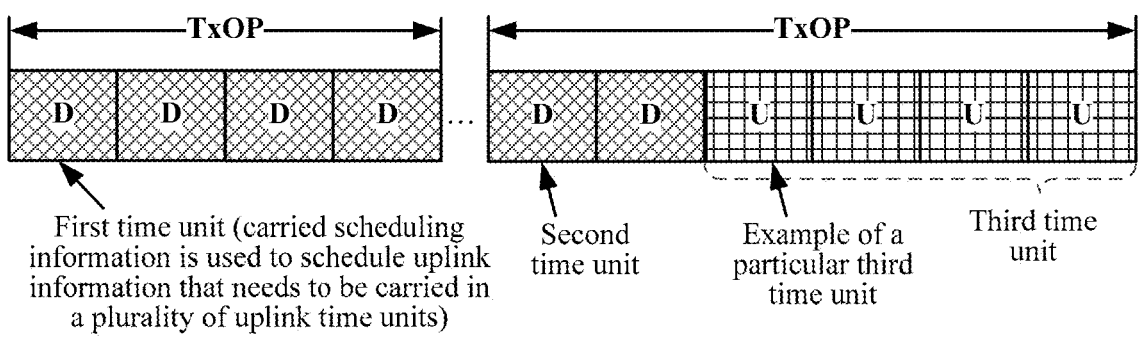
FIG. 26 is a schematic diagram of still another example of a manner of determining a third time unit according to an embodiment of the present application.

As shown in FIG. 26, in this embodiment of the present application, there may be one or more third time units. This is not particularly limited in the present application. When there are a plurality of third time units, each third time unit may be determined in the following manner.

Optionally, there are a plurality of third time units, and there are a plurality of first time offsets. The plurality of first time offsets are in a one-to-one correspondence with the plurality of third time units.

Specifically, in this embodiment of the present application, each third time unit may be determined based on a corresponding first time offset and second time unit. That is, a time interval (or a time offset) between each third time unit and each second time unit is a corresponding first time offset. The first time offset corresponding to each third time unit may be preconfigured, or may be explicitly indicated by the indication information, or may be implicitly indicated by the scheduling information. Optionally, when there are more than two third time units, a first time offset between the $1^{st}$ third time unit in the plurality of third time units and the second time unit may be preconfigured, or may be indicated by the third indication information, and first time offsets between other time units in the plurality of third time units and the second time unit may be directly indicated by the indication information or may be determined based on the first time offset between the $1^{st}$ third time unit in the plurality of third time units and the second time unit and time offsets between the other time units and the $1^{st}$ third time unit. The time offsets between the other time units and the $1^{st}$ third time unit may be implicitly indicated by the scheduling information, or may be explicitly indicated by other indication information.

For example, if the terminal device sends, in the plurality of (for example, N, where N is a positive integer greater than 1) third time units, the uplink information scheduled by using the scheduling information, the UE may determine that the $M^{th}$ time unit, the $(M+1)^{th}$ time unit, ..., the $(M+i)^{th}$ time unit, ..., and the $(M+N-1)^{th}$ time unit that are after the second time unit are the third time units, where $i \in [1, N-2]$. Herein, i may be understood as "the time offsets between the other time units and the $1^{st}$ third time unit" mentioned above. Optionally, if the terminal device sends, in the plurality of (for example, N, where N is a positive integer greater than 1) third time units, the uplink information scheduled by using the scheduling information, the UE may determine that the $M^{th}$ time unit, the $(M+n(1))^{th}$ time unit, ..., the $(M+n(i))^{th}$ time unit, ..., and the $(M+n(N-1))^{th}$ time unit that are after the second time unit are the third time units, where $i \in [1, N-2]$, and values corresponding to n(i) may be continuous or discontinuous. The values of n(i) may be preconfigured or may be indicated by the indication information.

For another example, the access network device may schedule, by using one UL grant (one piece of DCI) in the first time unit, the uplink information sent by the terminal device in the plurality of third time units, or may schedule, by using a plurality of UL grants (a plurality of pieces of DCI) in the first time unit, the uplink information sent by the UE in the plurality of third time units. In this embodiment of the present application, the plurality of UL grants may also be considered as the first indication information. If the first indication information is one piece of DCI, the $M^{th}$ time unit to the $(M+N-1)^{th}$ time unit after the second time unit may respectively correspond to the first piece of uplink information to the $N^{th}$ piece of uplink information scheduled by using the first indication information.

If the first indication information is a plurality of pieces of DCI, and control channel element (Control Channel Element, CCE) indexes (index) corresponding to the DCI are different, the $M^{th}$ time unit to the $(M+N-1)^{th}$ time unit after the second time unit may respectively correspond to uplink data scheduled by using the DCI corresponding to the CCE indexes in ascending order, or may respectively correspond to uplink data scheduled by using the DCI corresponding to the CCE indexes in descending order. Alternatively, another rule may be used. This is not specifically limited in this embodiment of the present application.

Optionally, there are a plurality of third time units, and the plurality of third time units are arranged in a third preset rule. The first time offset is an offset between the second time unit and a particular third time unit in the plurality of third time units.

Specifically, the first time offset may be an offset between the second time unit and a particular (for example, the $1^{st}$) third time unit in the plurality of third time units. In addition, in this embodiment of the present application, a positional relationship between the plurality of third time units and the particular third time unit may be preconfigured. That is, after the particular third time unit is determined based on the second time unit and the first time offset, remaining time units in the plurality of third time units may be determined based on the particular third time unit and the positional relationship between the plurality of third time units and the particular third time unit.

Further, in this embodiment of the present application, a positional relationship between the particular third time unit and the time units that are in the plurality of third time units and that are different from the particular third time unit may be preconfigured (for example, specified in a communication protocol), or may be indicated by the access network device to the terminal device by using signaling. This is not particularly limited in the present application.

Figure 27:
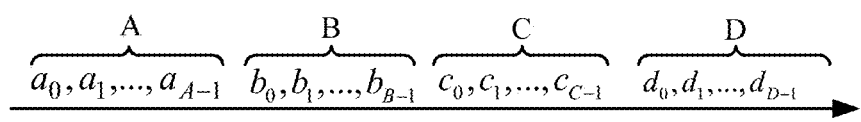
FIG. 27 is a schematic diagram of an example of uplink information according to an embodiment of the present application.

For example, when the scheduling information is used to schedule the UE to send uplink data in the plurality of third time units, the foregoing described M may correspond to the first time offset between the $1^{st}$ third time unit in the plurality of third time units and the second time unit. In this case, if the scheduling information is carried in one piece of DCI, the UE may determine the third time unit based on a chronological order of uplink data transmission in the detected DCI in combination with M. For example, as shown in FIG. 27, an order from left to right represents an order of scheduling information detected by the terminal device. In this way, the terminal device may send the uplink information in the $M^{th}$ time unit, the $(M+1)^{th}$ time unit, the $(M+2)^{th}$ time unit, and the $(M+3)^{th}$ time unit after the second time unit based on the scheduling information included in A/B/C/D.

It should be understood that the foregoing enumerated time sequence relationship between the plurality of third time units is merely an example for description. The present application is not limited thereto. For example, the third time units may be arranged contiguously. Alternatively, it may be specified that there are T (T≥1) time units (for example, a time length less than a time unit) between adjacent third time units. In addition, intervals between the adjacent third time units may be the same or different. This is not particularly limited in the present application.

Based on the uplink information transmission method in this embodiment of the present application, the terminal device may determine the third time unit based on the second time unit. In other words, a time offset between a time unit (for example, the third time unit) corresponding to the uplink data transmission and a time unit (the first time unit) in which the scheduling information is located is related to the second time unit including the downlink information. Therefore, in a process of determining a time sequence of the uplink data transmission, the terminal device may consider downlink data transmission occurring between the first time unit and the uplink time unit (the third time unit) including the uplink data transmission, especially considering uncertainty of the downlink data transmission between the first time unit and the third time unit. That is, when determining a scheduling time sequence, the terminal device may consider factors such as uncertainty of a location of the second time unit between the first time unit and the third time unit and uncertainty of a quantity of downlink time units between the first time unit and the third time unit, thereby avoiding problems in the prior art that the access network device and the terminal device have inconsistent understandings of a time unit in which the uplink transmission occurs or that the downlink data transmission is affected. Therefore, it is ensured that the access network device and the terminal device have a consistent understanding of a time unit in which the uplink data transmission occurs, and the downlink data transmission in the data transmission burst is not affected, thereby ensuring transmission efficiency of an unlicensed spectrum resource.

It should be noted that in this embodiment of the present application, the frequency at which the first time unit is located and the frequency at which the third time unit is located may be the same or different. For example, when both the first time unit and the third time unit are time units on an unlicensed band resource, the two frequencies may be the same or different. For another example, the first time unit is a time unit on a licensed band resource, and the third time unit is a time unit on an unlicensed band resource.

In this embodiment of the present application, the frequencies at which the first time unit and the second time unit are located may be the same or different. Optionally, if the first time unit and the second time unit belong to a same downlink burst, the frequency at which the first time unit is located and the frequency at which the second time unit is located are the same. If the first time unit and the second time unit belong to different downlink bursts, the frequency at which the first time unit is located and the frequency at which the second time unit is located may be the same or different.

In this embodiment of the present application, the frequencies at which the second time unit and the third time unit are located may be the same or different.

It should be noted that in this embodiment of the present application, regardless of whether the frequencies at which the first time unit and the second time unit are located are the same or not, that the second time unit is after the first time unit may be understood as that the second time unit is after the first time unit in terms of time. For example, an index corresponding to the second time unit is not less than an index corresponding to the first time unit. An index corresponding to a time unit is used to indicate the corresponding time unit. For example, the index corresponding to the time unit may be specifically used to indicate a specific location of the corresponding time unit on the unlicensed band resource. Optionally, the index corresponding to the time unit may be represented by a subframe index.

It should be noted that in this embodiment of the present application, regardless of whether the frequencies at which the second time unit and the third time unit are the same or not, that the third time unit is after the second time unit may be understood as that the third time unit is after the second time unit in terms of time. For example, an index corresponding to the third time unit is not less than an index corresponding to the second time unit. An index corresponding to a time unit is used to indicate the corresponding time unit. For example, the index corresponding to the time unit may be specifically used to indicate a specific location of the corresponding time unit on the unlicensed band resource. Optionally, the index corresponding to the time unit may be represented by a subframe index.

Figure 28:
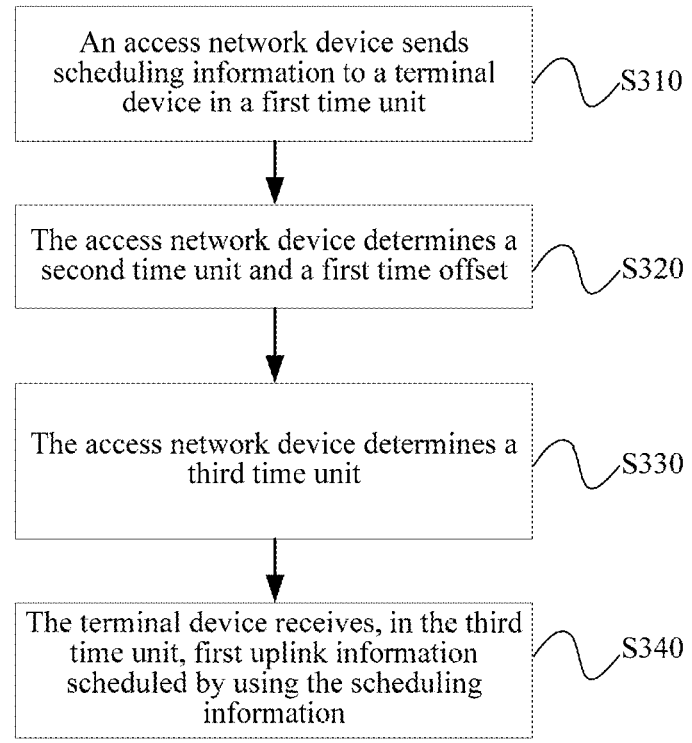
FIG. 28 is a schematic flowchart of an uplink information transmission method according to another embodiment of the present application.

FIG. 28 is a schematic flowchart of an uplink information receiving method 300 from a perspective of an access network device according to an embodiment of the present application. As shown in FIG. 28, the method 300 includes the following steps.

S310. The access network device sends scheduling information to a terminal device in a first time unit.

S320: The access network device determines a second time unit and a first time offset. The second time unit is after the first time unit, and the second time unit carries downlink information sent by the access network device.

S330. The access network device determines a third time unit. The third time unit is a time unit that is offset from the second time unit by the first time offset.

S340. The terminal device receives, in the third time unit, first uplink information scheduled by using the scheduling information.

In this embodiment of the present application, operations and processing processes performed by the access network device in the method 300 are similar to the operations and the processing processes performed by the access network device in the method 200. Herein, to avoid repetition, details are omitted. In addition, FIG. 28 shows only some processing processes of the access network device, and the access network device may further perform other processing processes of the access network device described in the method 200.

Figure 29:
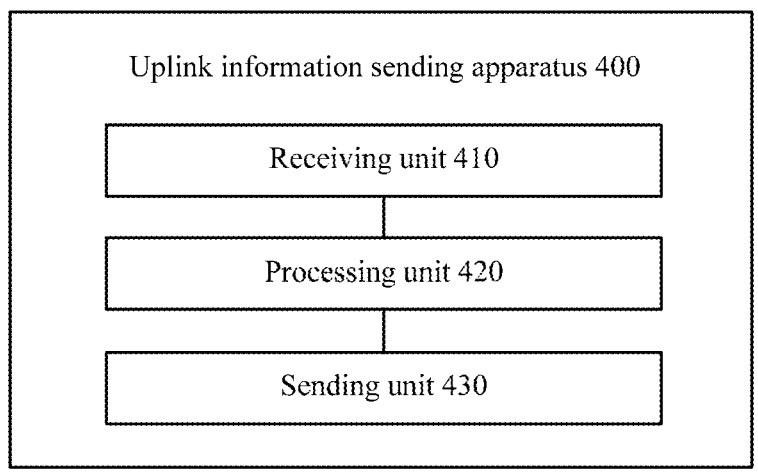
FIG. 29 is a schematic block diagram of an uplink information transmission apparatus according to an embodiment of the present application.

FIG. 29 is a schematic block diagram of an uplink information sending apparatus 400 according to an embodiment of the present application. The apparatus 400 may correspond to the terminal device (for example, the terminal device # A) described in the method 200, and various modules or units in the apparatus 400 are separately configured to perform the operations or the processing processes performed by the terminal device in the method 200. Herein, to avoid repetition, details are omitted.

In this embodiment of the present application, the apparatus 400 may include a processor and a transceiver. The processor is connected to the transceiver. Optionally, the apparatus further includes a memory. The memory is connected to the processor. Further, optionally, the apparatus includes a bus system. The processor, the memory, and the transceiver may be connected by using the bus system. The memory may be configured to store an instruction. The processor is configured to execute the instruction stored in the memory, to control the transceiver to send information or a signal.

A processing unit in the apparatus 400 shown in FIG. 29 may correspond to the processor, and a receiving unit and a sending unit in the apparatus 400 shown in FIG. 29 may correspond to the transceiver.

Figure 30:
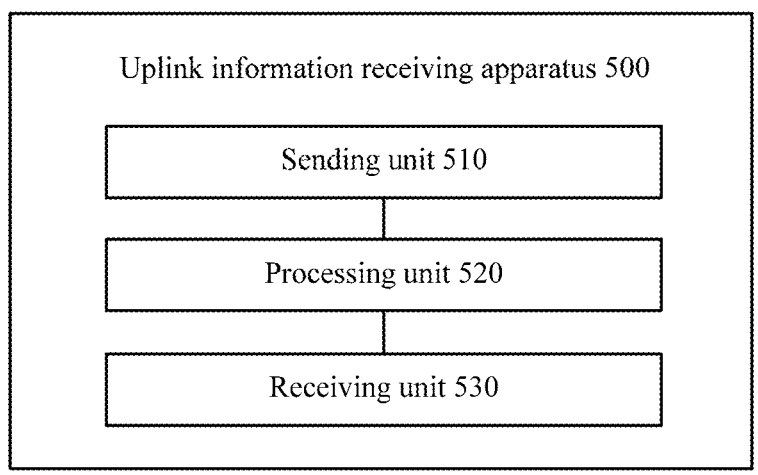
FIG. 30 is a schematic block diagram of an uplink information transmission apparatus according to another embodiment of the present application.

FIG. 30 is a schematic block diagram of an uplink information receiving apparatus 500 according to an embodiment of the present application. The apparatus 500 may correspond to the access network device described in the method 200 or 300, and various modules or units in the apparatus 500 are separately configured to perform the operations or the processing processes performed by the access network device in the method 200 or 300. Herein, to avoid repetition, details are omitted.

In this embodiment of the present application, the apparatus 500 may include a processor and a transceiver. The processor is connected to the transceiver. Optionally, the apparatus further includes a memory. The memory is connected to the processor. Further, optionally, the apparatus includes a bus system. The processor, the memory, and the transceiver may be connected by using the bus system. The memory may be configured to store an instruction. The processor is configured to execute the instruction stored in the memory, to control the transceiver to send information or a signal.

A processing unit in the apparatus 500 shown in FIG. 30 may correspond to the processor, and a receiving unit and a sending unit in the apparatus 500 shown in FIG. 30 may correspond to the transceiver.

It should be noted that the foregoing method embodiments of the present application may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The foregoing processor may be a general purpose processor, a digital signal processor (DSP), an application-specific integrated circuit (ASIC), a field programmable gate array (FPGA), or another programmable logic component, a discrete gate or a transistor logic component, or a discrete hardware component, and may implement or perform the methods, the steps, and logical block diagrams that are disclosed in the embodiments of the present application. The general purpose processor may be a microprocessor or the processor may be any conventional processor or the like. Steps of the methods disclosed with reference to the embodiments of the present application may be directly executed and accomplished by using a hardware decoding processor, or may be executed and accomplished by using a combination of hardware and software modules in a decoding processor. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It may be understood that the memory in the embodiments of the present application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. RAMs in many forms such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAIVI), a synchlink dynamic random access memory (SLDRAM), and a direct rambus random access memory (DR RAM) may be used. Those are examples rather than limitative descriptions. It should be noted that the memory of the systems and methods described in this specification includes but is not limited to those and any memory of another proper type.

It should be noted that in the embodiments of the present application, the mark "D" in this specification or the accompanying drawings in this specification may represent that the time unit includes downlink information, and the mark "U" may represent that the time unit includes uplink information.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

A person of ordinary skill in the art may be aware that the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on this understanding, the technical solution of the present application or the part that makes contributions to the prior art or part of the technical solution can be substantially embodied in the form of a software product. The computer software product is stored in a storage medium, and contains several instructions to instruct a computer device (such as, a personal computer, a server, or an access network device) to perform all or a part of steps of the method as described in the embodiments of the present application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method, comprising:
   receiving, by a terminal device in a first time unit, configuration information and scheduling information from an access network device, wherein the configuration information and the scheduling information are included in a same downlink control information (DCI), wherein the configuration information comprises 1-bit information indicating a transmission mode, and wherein when a value of the 1-bit information is 1, a third time unit is determined based on a second time unit; and
   after receiving the scheduling information:
      determining, by the terminal device, the second time unit which carries common control information sent by the access network device, wherein the second time unit is after the first time unit;
      determining, by the terminal device, a first time offset based on the scheduling information;
      determining, by the terminal device, the third time unit based on the first time offset and the second time unit; and
      sending, by the terminal device in the third time unit, first uplink information scheduled by using the scheduling information.

2. The method according to claim 1, wherein:
the first time unit belongs to a first downlink burst, the second time unit belongs to a second downlink burst, the second downlink burst is after the first downlink burst, and there are L downlink bursts between the second downlink burst and the first downlink burst, wherein L is an integer, and L≥0.

3. The method according to claim 2, wherein:
the second time unit is the second to last downlink time unit in the second downlink burst; or
the second time unit is the last downlink time unit in the second downlink burst.

4. The method according to claim 1, wherein:
the common control information is used to indicate an end moment of a downlink burst to which the second time unit belongs.

5. An apparatus, comprising:
at least one processor; and
a storage medium coupled to the at least one processor, the storage medium comprising executable instructions that, when executed by the at least one processor, cause the apparatus to:
   receive, in a first time unit, configuration information and scheduling information sent by an access network device, wherein the configuration information and the scheduling information are included in a same downlink control information (DCI), wherein the configuration information comprises 1-bit information indicating a transmission mode, and wherein when a value of the 1-bit information is 1, a third time unit is determined based on a second time unit; and
   after receiving the scheduling information:
      determine the second time unit which carries common control information sent from the access network device, wherein the second time unit is after the first time unit;
      determining a first time offset based on the scheduling information;
      determine the third time unit based on the first time offset and the second time unit; and
      send, in the third time unit, first uplink information scheduled by using the scheduling information.

6. The apparatus according to claim 5, wherein:
the first time unit belongs to a first downlink burst, the second time unit belongs to a second downlink burst, the second downlink burst is after the first downlink burst, and there are L downlink bursts between the second downlink burst and the first downlink burst, wherein L is an integer, and L≥0.

7. The apparatus according to claim 6, wherein:
the second time unit is the second to last downlink time unit in the second downlink burst; or the second time unit is the last downlink time unit in the second downlink burst.

8. The apparatus according to claim 5, wherein:
the common control information is used to indicate an end moment of a downlink burst to which the second time unit belongs.

9. A non-transitory computer-readable storage medium comprising instructions that, when executed by a computer, cause the computer to:
- receive, in a first time unit, configuration information and scheduling information from an access network device, wherein the configuration information and the scheduling information are included in a same downlink control information (DCI), wherein the configuration information comprises 1-bit information indicating a transmission mode, and wherein when a value of the 1-bit information is 1, a third time unit is determined based on a second time unit; and
- after receiving the scheduling information:
  - determine the second time unit which carries common control information sent by the access network device, wherein the second time unit is after the first time unit;
  - determining a first time offset based on the scheduling information;
  - determine the third time unit based on the first time offset and the second time unit; and
  - send, in the third time unit, first uplink information scheduled by using the scheduling information.

10. The non-transitory computer-readable storage medium according to claim 9, wherein:
the common control information is used to indicate an end moment of a downlink burst to which the second time unit belongs.

11. The non-transitory computer-readable storage medium according to claim 9, wherein:
the first time unit belongs to a first downlink burst, the second time unit belongs to a second downlink burst, the second downlink burst is after the first downlink burst, and there are L downlink bursts between the second downlink burst and the first downlink burst, wherein L is an integer, and $L \geq 0$.

12. The non-transitory computer-readable storage medium according to claim 11, wherein:
the second time unit is the second to last downlink time unit in the second downlink burst; or
the second time unit is the last downlink time unit in the second downlink burst.

* * * * *